(12) United States Patent
Sern et al.

(10) Patent No.: US 11,436,499 B2
(45) Date of Patent: Sep. 6, 2022

(54) SYSTEM AND METHOD FOR DETECTING DOMAIN GENERATION ALGORITHMS (DGAS) USING DEEP LEARNING AND SIGNAL PROCESSING TECHNIQUES

(71) Applicant: Ensign Infosecurity Pte. Ltd., Singapore (SG)

(72) Inventors: Lee Joon Sern, Singapore (SG); Gui Peng David Yam, Singapore (SG); Quek Han Yang, Singapore (SG); Chan Jin Hao, Singapore (SG)

(73) Assignee: Ensign InfoSecurity Pte. Ltd., Singapore (SG)

( * ) Notice: Subject to any disclaimer, the term of this patent is extended or adjusted under 35 U.S.C. 154(b) by 0 days.

(21) Appl. No.: 17/552,973

(22) Filed: Dec. 16, 2021

(65) Prior Publication Data
US 2022/0245461 A1 Aug. 4, 2022

(30) Foreign Application Priority Data

Jan. 26, 2021 (SG) .............................. 10202100813P

(51) Int. Cl.
*G06N 3/08* (2006.01)
*H04L 61/4511* (2022.01)
*G06F 17/14* (2006.01)

(52) U.S. Cl.
CPC ............ *G06N 3/088* (2013.01); *G06F 17/141* (2013.01); *H04L 61/1511* (2013.01)

(58) Field of Classification Search
CPC .... G06N 3/088; G06F 17/141; H04L 61/1511
See application file for complete search history.

(56) References Cited

U.S. PATENT DOCUMENTS

| 10,958,668 | B1* | 3/2021 | Wang ................... H04L 63/1416 |
| 2018/0351972 | A1* | 12/2018 | Yu ........................ H04L 63/1458 |
| 2021/0160262 | A1* | 5/2021 | Bynum ................... H04L 43/16 |

OTHER PUBLICATIONS

Gu et al., "BotSniffer: Detecting Botnet Command and Control Channels in Network Traffic," Proceedings of the 15th Annual Network and Distributed System Security Symposium (2008) (Year: 2008).*

(Continued)

*Primary Examiner* — Miranda M Huang
*Assistant Examiner* — Yao David Huang
(74) *Attorney, Agent, or Firm* — Sterne, Kessler, Goldstein & Fox P.L.L.C.

(57) ABSTRACT

System and method for detecting domain names that exhibit Domain Generation Algorithm (DGA) like behaviours from a stream of Domain Name System (DNS) records. In particular, this document describes a system comprising a deep learning classifier (DL-C) module for receiving and filtering the stream of DNS records before the filtered DNS records, which have been determined to possess domain names that exhibit DGA behaviour are provided to a series filter-classifier (SFC) module. The SFC module then groups the records into various series based on source IP, destination IP and time. For each series, it then filters away records that do not exhibit the dominant DGA characteristics of the series. Finally, for each series, it makes use of the remaining DNS records' timestamps to generate a time series of DGA occurrences and then, using this time series of occurrences, determine the number of DGA bursts throughout the time period of analysis.

18 Claims, 7 Drawing Sheets

(56) References Cited

OTHER PUBLICATIONS

Yadav et al., "Winning with DNS Failures: Strategies for Faster Botnet Detection," International Conference on Security and Privacy in Communication Systems, SecureComm 2011: Security and Privacy in Communication Networks pp. 446-459 (Year: 2011).*

Agyepong et al., "Detection of Algorithmically Generated Malicious Domain," Dhinaharan Nagamalai et al. (Eds): ACSIT, ICITE, SIPM-2018 pp. 13-32, 2018, (Year: 2018).*

Anderson et al., "DeepDGA: Adversarially-Tuned Domain Generation and Detection," AISec'16, Oct. 28, 2016, Vienna, Austria, (Year: 2016).*

Li Y. et al., A Machine Learning Framework for Domain Generation Algorithm-Based Malware Detection. IEEE Access, Jan. 31, 2019, vol. 7, pp. 32765-32782. Whole document especially 1. Introduction, 1) The Proposed Machine Learning Framework, 4) A Time-Series Predictor, A. Assumptions and Threat Models, 2. Feature Extractor, Fig. 7.

Kumar A. D. et al., Enhanced Domain Generating algorithm Detection Based on Deep Neural Networks. Deep Learning Applications for Cyber Security, Aug. 31, 2019, pp. 151-173 Whole document.

Lo E. et al., Internet of Things (IoT) Discovery Using Deep Neural Networks, 2020 IEEE Winter Conference on Applications of Computer Vision (WACV), May 14, 2020, pp. 806-814 Whole document.

Intellectual Property Office of Singapore Search Report, pp. 2.

* cited by examiner

Series of domains identified as DGA  Temporal analysis of DNS records timestamp

SYSTEM AND METHOD FOR DETECTING DOMAIN GENERATION ALGORITHMS (DGAS) USING DEEP LEARNING AND SIGNAL PROCESSING TECHNIQUES

CROSS-REFERENCE TO RELATED APPLICATIONS

This application claims the benefit of foreign priority application Singapore Patent Application No. 10202100813P, filed on Jan. 26, 2021, the contents of which is incorporated herein in its entirety.

FIELD OF THE INVENTION

This invention relates to a system and method for detecting domain names that exhibit Domain Generation Algorithm (DGA) like behaviours from a stream of Domain Name System (DNS) records. In particular, this invention relates to a system comprising a deep learning classifier (DL-C) module for receiving and filtering the stream of DNS records before the filtered DNS records, which have been determined to possess domain names that exhibit DGA behaviour (hereinafter, these domain names shall be referred interchangeably as DGA domain names or possible DGA domain names), are provided to a series filter-classifier (SFC) module.

For each source Internet Protocol (IP), destination IP and time period of analysis triplet, the SFC module then groups the associated DGA records into various series. For each series, it then filters away DGA domain names and their corresponding DNS records that do not exhibit similar DGA characteristics as determined by the DL-C module. Next, the SFC module tags a label to each series of remaining DGA records that exist between each source IP, destination IP and period of analysis. Finally the SFC module makes use of the DNS records' timestamps to generate a time series of DGA occurrences and then, using this time series of occurrences, determine the number of DGA bursts throughout the time period of analysis.

An autoencoder-classifier (AE-C) then assigns coherence scores, by analysing correlations over a time period, to each series of DGA records based on its corresponding time series of DGA occurrences. A frequency spectrum analyser (FSA) module is then used to convert the time series of DGA occurrences into a frequency spectrum, before it identifies periodic DGA bursts occurring within each series of DGA records. In parallel, a finding successful resolutions (FSR) module makes use of the characteristics of each series, as determined by the SFC module, to find DGA domain names that resolved to possible Command and Control (C2) servers. The information generated by the FSR, FSA and AE-C modules together with the series of possible DGA domain names produced by the SFC module and other enriching details are then passed to an alert module which then uses this information to present and prioritize DGA alerts enriched with both textual and temporal information to the user, allowing the user to better focus his attention on those alerts with: obvious textual similarities within the series of domain names that have been assessed to exhibit DGA behaviour, higher coherence scores as assessed by the AE-C module, periodicity as assessed by our FSA module, and possible resolutions to possible C2 servers as assessed by the FSR module.

SUMMARY OF PRIOR ART

Domain Generation Algorithms (DGAs) are algorithms that are widely used by malicious software to establish a communication link between the infected network and the malicious party's Command & Control (C2) servers. Such attacks are difficult to detect and prevent as the malicious party's C2 servers typically do not have a static domain name, but instead, typically utilizes a random dynamic one that constantly changes with time.

Thus, there is a need for the malware to query multiple domain names over a period of time and at various time instants (i.e. a burst like behaviour) to conduct a "brute-force" search to determine the domain at which the attacker's C2 servers are currently located at. As the domains generated by DGA can be generated on the fly, the use of a simple blacklist of domain names would be ineffective against blocking DGA threats as the blacklist may not be exhaustive in relation to the domain names that could be generated by the DGA.

An interesting by-product of DGA algorithms is that many of the DNS requests made by an infected computer would be replied with the response code ("rcode") NXDOMAIN, indicating that the domain does not exist. This is because out of all the queries made by the malicious software, only a few selected domains would be correct and these domains would reply with a NOERROR rcode. These would then be the domains where the C2 server infrastructure is located. As the number of received NXDOMAIN rcodes would be large, most anti-DGA algorithms focus on these DNS queries to determine if DGAs are being used within the network or not. If such DNS queries are detected in abundance, this would indicate the possibility of the computer/server being infected by a malicious software, as the malicious software would be trying to communicate back to its C2 server.

The current industry practice to detect DGAs is to use machine learning methods, together with extensive feature engineering, to determine whether a NXDOMAIN domain name queried by a network was created by DGAs. Examples of commonly used features include normalized entropy of characters, n-grams, symbol character ratio, vowel character ratio, etc. Recently, these practices have been further refined by researchers who have started employing the use of deep learning techniques, in particular, Recurrent Neural Network (RNN) and Convolutional Neural Network (CNN) architectures, at the character levels, to determine whether a NXDOMAIN domain string comprises a DGA or not.

Others have tried to make use of machine learning algorithms, particularly, random forests, to first flag out strings that may be potential DGAs. In particular, hand engineered features like entropy-based features (e.g. entropy of the top level domains, 2nd level domains, 3rd level domains, etc.) and structural domain features (e.g. length of domain name, number of domain levels, etc.) were used by the random forest algorithm to determine if a particular string is DGA or not. Next, similar strings are then correlated over time. Strings are defined to be similar if they exhibit similar entropy-based and structural domain features. Those strings that correlate over time are then declared as DGA and are stored in a database to be used for further refinement of the random forest algorithm over time.

Others have tried to study the occurrence of DGA and then try to determine if any meaningful temporal structures can be observed from these studies. Those skilled in the art have shown that malware samples that employ DGA, particularly, Conficker and Kraken type DGAs, exhibit some temporal behaviour. It was shown that a decision tree trained with hand engineered features, derived from the time series of when the DGAs are fired out by the malware, was able to detect DGA behaviour over a very small sample set. However, it is useful to note that they were unable to extract useful features from frequency spectrum analysis, and thus their analysis was focused on extracting hand engineered time domain features. Furthermore, they were not able to realise a working system as their analysis required actual malware samples which isn't easily obtained and would not work if visibility is constrained only to network traffic data. Thus, the dataset that they used for analysis was rather small. Finally, they also concluded that their method of detecting DGA using the time domain features resulted in high False Positive rates that make it unsuitable for large scale deployment or implementation.

The methods proposed above merely involve a binary classification as to whether a domain name or a series of domain names constitute DGA or not, and does not carry out any analysis on the type of DGA characteristics displayed by the identified domain name. Additionally, when machine learning algorithms and/or methods were utilized together with clustering, the features used to train these models tend to be hand engineered and this places a soft constraint on the output as the outcome of the clustered output would be constrained by the type of features that were hand engineered. In other words, while the clustered outputs may be more human interpretable, the generated clusters are typically more constrained, as such, this hinders the discovery of possible new variants of DGAs. Furthermore, to the best of our knowledge, no system has thus far been successful in making use of temporal features to detect DGA.

For the above reasons, those skilled in the art are constantly striving to come up with a scalable system and method capable of providing more contextual information and automated analysis of suspicious DNS records that exhibit DGA-like behaviours so that a more thorough analysis may be made of these DNS records thereby allowing DGA to be detected accurately.

SUMMARY OF THE INVENTION

The above and other problems are solved and an advance in the art is made by systems and methods provided by embodiments in accordance with the invention.

A first advantage of embodiments of systems and methods in accordance with the invention is that given a single domain name, the invention is able to simultaneously classify whether it is a possible DGA or not, and if it is deemed to be a possible DGA, the invention will determine, based on the currently known DGA families, which characteristics among the various known DGA families are exhibited by the domain name. This processing is done completely autonomously without the need for any hand engineered features and human defined rules.

A second advantage of embodiments of systems and methods in accordance with the invention is that the invention is able to look back over a period of analysis (in our embodiment, 1 day) between a particular source and destination IP, to detect possible DGAs that exhibit similar characteristics and drop the others, without the need for any hand engineered features and human defined rules.

A third advantage of embodiments of systems and methods in accordance with the invention is that the invention is able to identify series of possible DGAs that look visually similar, but yet having differing Top Level Domains, automatically and efficiently, without the need for any hand engineered features and human defined rules.

A fourth advantage of embodiments of systems and methods in accordance with the invention is that on top of providing the series of possible DGA domain names to the user, the invention is able to provide other enriching sources of information that are not provided by any other system or research in the industry.

A fifth advantage of embodiments of systems and methods in accordance with the invention is that the invention computes a coherence score for each series of possible DGAs using the timestamps of when the associated DNS records were observed. This provides the users an idea of how often temporal characteristics of any DGA series is being repeated over the period of correlation (in our embodiment, 1 month). A higher coherence score indicates that similar temporal characteristics are displayed multiple times over the period of correlation, indicating an even more suspicious behaviour.

A sixth advantage of embodiments of systems and methods in accordance with the invention is that the invention is able to utilize the Frequency Spectrum Analyser (FSA) module to determine if the timestamps of the associated DNS records of the possible DGAs exhibit some kind of periodic behaviour, providing more confirmation of the existence of an automated software/malware, as human behaviour tend to be non-periodic.

A seventh advantage of embodiments of systems and methods in accordance with the invention is that the invention is able to utilize both the string analysis and the temporal analysis capability of the invention to identify new non-DGA threats that are exhibiting behaviours that are not commonly known yet.

An eighth advantage of embodiments of systems and methods in accordance with the invention is that the invention is able to identify the actual successful DNS resolutions of the DGA malware by determining whether each possible DGA NOERROR DNS record corresponding to a given series of possible DGA NXDOMAIN DNS records, in terms of source IP, destination IP and time period of analysis, possesses similar DGA characteristics as those in the given series of possible DGA NXDOMAIN DNS records. Successful resolutions provide users not just a higher confidence of the results but also helps them prioritize their work as successful resolutions imply a higher state of urgency as it indicates that possible data exfiltration is already taking place.

The above advantages are provided by embodiments of a method in accordance with the invention operating in the following manner.

According to a first aspect of the invention, a system for detecting Domain Generation Algorithm (DGA) behaviours is disclosed, the system comprising: a deep learning classifier (DL-C) module configured to: receive a stream of Domain Name System (DNS) records; identify DNS records having DGA associated domain names and the DGA characteristics associated with each of the DGA associated domain names, a series filter-classifier (SFC) module configured to: group identified DNS records from the DL-C module into series based on source IP, destination IP and time period of analysis associated with each identified DGA DNS record; for each series, identify and select NXDOMAIN DGA associated domain names that exhibit at least one of a top-c occurring DGA characteristics of the series as one of its top-k characteristics, and labelling the series based on the top occurring DGA characteristic; sort each series based on their associated timestamps and normalize the timestamps in each series based on a first record of the series to obtain a time series of DGA occurrences over the time period of analysis; provide NOERROR DNS records unassociated with the identified NXDOMAIN DGA DNS records to a finding successful resolutions (FSR) module, the FSR module being configured to identify DGA domains associated with command and control servers from the received DNS records; an autoencoder-classifier (AE-C) module comprising an autoencoder and a classifier merged into a single neural network with the AE-C module being configured to: for each time series of DGA occurrences obtained from the SFC module, generate a coherence score for each labelled series; remove series having coherence scores below a predefined threshold; wherein the autoencoder-classifier module was trained using the labelled time series of occurrences obtained from the SFC module, and a loss function based on components of a one-hot vector $\hat{p}$ that was derived from the labels of the series, dimensions of a softmax output $\hat{P}$ of the classifier and a reconstruction loss weighted by coefficient $\alpha$; a frequency spectrum analyser (FSA) module configured to: identify DGA frequency domain peaks associated with each of the time series of DGA occurrences for the purpose of determining periodic signals within each of the time series of DGA occurrences; determine a frequency and a corresponding period for each of the periodic signals within each of the time series of DGA occurrences; identify a number of phase-shifted signals present for each of the determined frequencies; an alert module configured to prioritize DGA alerts based on the time series of DGA occurrences produced by the SFC module, the time series produced by the AE-C module, the identified number of phase shifted signals determined by the FSA module, and the identified DGA domains as determined by the FSR module.

With regard to the first aspect of the invention, the system further comprises: a smoothing filter and Discrete Fourier Transform module being configured to: apply, a smoothing filter, to the time series of DGA occurrences output by the SFC module; and convert, using a Discrete Fourier Transform algorithm, the filtered time series of DGA occurrences from the time domain to a frequency domain so that inputs to the neural network of the AE-C module comprises a frequency spectrum.

With regard to the first aspect of the invention, the system further comprises: a machine learning string analyser (ML-SA) module, wherein before the deep learning classifier module identifies the DNS records having DGAs and their associated characteristics, the ML-SA module is configured to: filter, using a machine learning algorithm, the DNS records to remove domain names that are not associated with known DGAs from the DNS records, whereby the machine learning algorithm was trained using at least one of the following labelled features: length of a domain name, entropy of a domain name, character n-gram of a domain name, distinct character count of a domain name, webgram or wordgram similarity scores, and whereby the machine learning algorithm is trained using a labelled open-source dataset, internal databases and third party databases.

With regard to the first aspect of the invention, the deep learning classifier module comprises: a You-Only-Look-Once (YOLO) architecture configured to: train itself based on character level tokenisation to produce a set of embeddings that is passed through a neural network to produce a binary decision to determine if a domain name string comprises a DGA and if it is determined that the domain name string comprises a DGA, to generate a probability distribution indicating which family of known DGA the domain name string belongs to.

With regard to the first aspect of the invention, wherein the YOLO architecture comprises an embedding layer communicatively connected to a deep neural network, whereby the embedding layer is configured to convert a list of character tokens to a matrix, and wherein the deep neural network is configured to use a composite loss function based on a binary cross entropy loss and a categorical cross entropy loss, where the composite loss function is defined as:

$$\text{Composite Loss} = (-b\log(B) - (1-b)\log\log(1-B)) + \gamma b\left(-\sum_{i}^{n} t_i \log\log(C_i)\right)$$

where b is defined as a label that indicates whether a particular string comprises a DGA, B is defined as the sigmoid output of the neural network which indicates whether a particular string is DGA, $t_i$ is defined as a particular dimension of a one-hot vector, which is activated only at a location corresponding to a family label of the particular DGA string, $\hat{C}$ is defined as a softmax activated vector output by the neural network, n is defined as a total number of dimensions of $\hat{C}$, which corresponds to a total number of known DGA families used to train the model, and $\gamma$ is defined as a tune-able coefficient which is used to weight the relative importance between the binary cross entropy loss and the softmax cross entropy loss.

With regard to the first aspect of the invention, wherein before the SFC module is applied to the DNS records that have been associated with DGA domain strings by the DL-C module, a blacklist and rule based filtering module is configured to: remove, using a blacklist, legitimate domains associated with DGA-like algorithm; and remove domain names having invalid Domain and Top-Level Domain (TLD) features.

With regard to the first aspect of the invention, wherein the loss function used to train the autoencoder-classifier module is defined as:

$$\text{Loss} = -\sum_{i}^{n} p_i \log\log(P_i) + \alpha \|I_y - I_x\|^2$$

where $I_X$ is defined as an input signal related to the time series of the DGA occurrences output by the SFC module, which is fed as input to the autoencoder, $I_Y$ is the output signal of the autoencoder, $p_i$ is the $i^{th}$ dimension of the one-hot vector $\hat{p}$, which is derived from the label tagged to the series by the SFC module, $P_i$ is an $i^{th}$ dimension of the softmax output, $\hat{P}$, of the classifier, and a is a reconstruction loss coefficient that is used to weight a relative importance of the classification loss versus the reconstruction loss.

With regard to the first aspect of the invention, the peak detection and hierarchical clustering algorithm used in the SFC, to count the number of DGA bursts, and FSA module, to detect peaks in the frequency spectrum, comprises a constant false alarm rate (CFAR) detection algorithm for peak detection and agglomerative clustering for hierarchical clustering.

With regard to the first aspect of the invention, the FSR module is further configured to: obtain, from the deep learning classifier module, DNS records having DGA associated domain names but tagged with NOERROR return code by the DNS server; obtain, from the SFC module, top-c DGA characteristics of each of the series output by the SFC module; identify, from the NOERROR DNS records with DGA associated domain names, DNS records that correspond to each series, in terms of source IP, destination IP and time period of analysis, that exhibit at least one of the top-c DGA characteristics of the corresponding series as one of their top-k DGA characteristics, as determined by the SFC module; and provide the identified domain names corresponding to each series to the alert module.

According to a second aspect of the invention, a method for detecting Domain Generation Algorithm (DGA) behaviours using a system comprising a deep learning classifier (DL-C) module; a series filter-classifier (SFC) module; a finding successful resolutions (FSR) module; an autoencoder-classifier (AE-C) module comprising an autoencoder and a classifier merged into a single neural network; a frequency spectrum analyser (FSA) module and an alert module is disclosed, the method comprising: receiving, using the DL-C module, a stream of Domain Name System (DNS) records; identifying, using the DL-C module, DNS records having DGA associated domain names and the DGA characteristics associated with each of the DGA associated domain names, grouping, using the SFC module, identified DNS records from the DL-C module into series based on source IP, destination IP and time period of analysis associated with each identified DGA DNS record whereby for each series, identifying and selecting NXDOMAIN DGA associated domain names that exhibit at least one of a top-c occurring DGA characteristics of the series as one of its top-k characteristics, and labelling the series based on the top occurring DGA characteristic; sorting, using the SFC module, each series based on their associated timestamps and normalizing the timestamps in each series based on a first record of the series to obtain a time series of DGA occurrences over the time period of analysis; providing, using the SFC module, NOERROR DNS records un-associated with the identified NXDOMAIN DGA DNS records to a finding successful resolutions (FSR) module, the FSR module being configured to identify DGA domains associated with command and control servers from the received DNS; generating, using the AE-C module, for each time series of DGA occurrences obtained from the SFC module, a coherence score for each labelled series, and removing series having coherence scores below a predefined threshold, wherein the autoencoder-classifier module was trained using the labelled time series of occurrences obtained from the SFC module, and a loss function based on components of a one-hot vector p̂ that was derived from the labels of the series, dimensions of a softmax output P̂ of the classifier and a reconstruction loss weighted by coefficient α; identifying, using the FSA module, DGA frequency domain peaks associated with each of the time series of DGA occurrences for the purpose of determining periodic signals within each of the time series of DGA occurrences; determining, using the FSA module, a frequency and a corresponding period for each of the periodic signals within each of the time series of DGA occurrences; identifying, using the FSA module, a number of phase-shifted signals present for each of the determined frequencies; and prioritizing, using the alert module, DGA alerts based on the time series of DGA occurrences produced by the SFC module, the time series produced by the AE-C module, the identified number of phase shifted signals determined by the FSA module, and the identified DGA domains as determined by the FSR module.

According to a second aspect of the invention, the method further comprises the steps of: applying, using a smoothing filter and Discrete Fourier Transform module, a smoothing filter to the time series of DGA occurrences output by the SFC module; and converting, using a Discrete Fourier Transform algorithm, the filtered time series of DGA occurrences from the time domain to a frequency domain so that inputs to the neural network of the AE-C module comprises a frequency spectrum.

According to a second aspect of the invention, whereby before the step of the deep learning classifier module identifying the DNS records having DGAs and their associated characteristics, the method further comprises the steps of: filtering, using a machine learning string analyser (ML-SA) module, based on a machine learning algorithm, the DNS records to remove domain names that are not associated with known DGAs from the DNS records, whereby the machine learning algorithm was trained using at least one of the following labelled features: length of a domain name, entropy of a domain name, character n-gram of a domain name, distinct character count of a domain name, webgram or wordgram similarity scores, and whereby the machine learning algorithm is trained using a labelled open-source dataset, internal databases and third party databases.

According to a second aspect of the invention, the deep learning classifier module comprises: a You-Only-Look-Once (YOLO) architecture configured to: train itself based on character level tokenisation to produce a set of embeddings that is passed through a neural network to produce a binary decision to determine if a domain name string comprises a DGA and if it is determined that the domain name string comprises a DGA, to generate a probability distribution indicating which family of known DGA the domain name string belongs to.

According to a second aspect of the invention, the YOLO architecture comprises an embedding layer communicatively connected to a deep neural network, whereby the embedding layer is configured to convert a list of character tokens to a matrix, and wherein the deep neural network is configured to use a composite loss function based on a binary cross entropy loss and a categorical cross entropy loss, where the composite loss function is defined as:

$$\text{Composite Loss} = (-b\log(B) - (1-b)\log\log(1-B)) + \gamma b\left(-\sum_{i}^{n} t_i \log\log(C_i)\right)$$

where b is defined as a label that indicates whether a particular string comprises a DGA, B is defined as the sigmoid output of the neural network which indicates whether a particular string is DGA, $t_i$ is defined as a particular dimension of a one-hot vector, which is activated only at a location corresponding to a family label of the particular DGA string, e is defined as a softmax activated vector output by the neural network, n is defined as a total number of dimensions of Ĉ, which corresponds to a total number of known DGA families used to train the model, and γ is defined as a tune-able coefficient which is used to weight the relative importance between the binary cross entropy loss and the softmax cross entropy loss.

According to a second aspect of the invention, wherein before the step of applying the SFC module to the DNS records that have been associated with DGA domain strings by the DL-C module, the method comprises the steps of: removing, using a blacklist and rule based filtering module, legitimate domains associated with DGA-like algorithm; and remove domain names having invalid Domain and Top-Level Domain (TLD) features.

According to a second aspect of the invention, wherein the loss function used to train the autoencoder-classifier module is defined as:

$$\text{Loss} = -\sum_{i}^{n} p_i \log\log(P_i) + \alpha \|I_y - I_x\|^2$$

where $I_X$ is defined as an input signal related to the time series of the DGA occurrences output by the SFC module, which is fed as input to the autoencoder, $I_Y$ is the output signal of the autoencoder, $p_i$ is the $i^{th}$ dimension of the one-hot vector $\hat{p}$, which is derived from the label tagged to the series by the SFC module, $P_i$ is an $i^{th}$ dimension of the softmax output, $\hat{P}$, of the classifier, and a is a reconstruction loss coefficient that is used to weight a relative importance of the classification loss versus the reconstruction loss.

According to a second aspect of the invention, the peak detection and hierarchical clustering algorithm used in the SFC, to count the number of DGA bursts, and FSA module, to detect peaks in the frequency spectrum, comprises a constant false alarm rate (CFAR) detection algorithm for peak detection and agglomerative clustering for hierarchical clustering.

According to a second aspect of the invention, the method further comprises the steps of: obtaining, using the FSR module, from the deep learning classifier module, DNS records having DGA associated domain names but tagged with NOERROR return code by the DNS server; obtaining, using the FSR module, from the SFC module, the top-c DGA characteristics of each of the series output by the SFC module; identifying, using the FSR module, from the NOERROR DNS records with DGA associated domain names, DNS records that correspond to each series, in terms of source IP, destination IP and time period of analysis, that exhibit at least one of the top-c DGA characteristics of the corresponding series as one of their top-k DGA characteristics, as determined by the SFC module; and providing, using the FSR module, the identified domain names corresponding to each series to the alert module.

BRIEF DESCRIPTION OF THE DRAWINGS

The above and other problems are solved by features and advantages of a system and method in accordance with the present invention described in the detailed description and shown in the following drawings.

DETAILED DESCRIPTION

Figure 1:
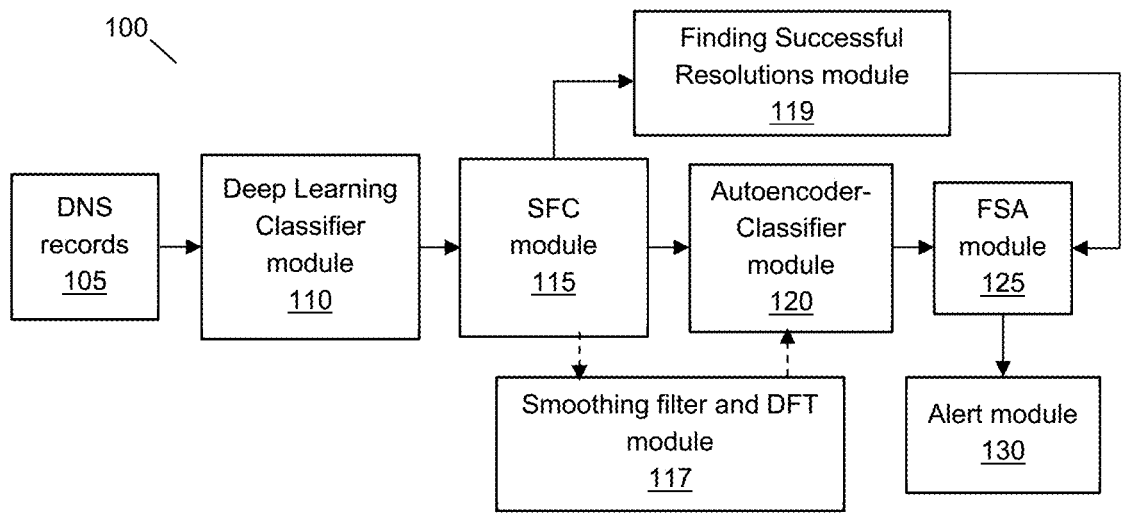
FIG. 1 illustrating block diagram of modules that may be used to implement the system for detecting Domain Generation Algorithm (DGA) behaviours in accordance with embodiments of the invention.

This invention relates to a system and method for detecting domain names that exhibit Domain Generation Algorithm (DGA) like behaviours from a stream of Domain Name System (DNS) records. In particular, this invention relates to a system comprising a deep learning classifier (DL-C) module for receiving and filtering the stream of DNS records before the filtered DNS records, which have been determined to possess domain names that exhibit DGA behaviour (hereinafter, these domain names shall be referred interchangeably as DGA domain names or possible DGA domain names), are provided to a series filter-classifier (SFC) module.

For each source Internet Protocol (IP), destination IP and time period of analysis triplet, the SFC module then groups the associated DGA records into various series. For each series, it then filters away DGA domain names and their corresponding DNS records that do not exhibit similar DGA characteristics as determined by the DL-C module. Next, the SFC module tags a label to each series of remaining DGA records that exist between each source IP, destination IP and period of analysis.

Finally, the SFC module makes use of the DNS records' timestamps to generate a time series of DGA occurrences and then, using this time series of occurrences, determine the number of DGA bursts throughout the time period of analysis.

An autoencoder-classifier (AE-C) then assigns coherence scores, by analysing correlations over a time period of correlation, to each series of DGA records based on its corresponding time series of DGA occurrences. A frequency spectrum analyser (FSA) module is then used to convert the time series of DGA occurrences into a frequency spectrum, before it identifies periodic DGA bursts occurring within each series of DGA records. In parallel, a finding successful resolutions (FSR) module makes use of the characteristics of each series, as determined by the SFC module, to find DGA domain names that resolved to possible Command and Control (C2) servers. The information generated by the FSR, FSA and AE-C modules together with the series of possible DGA domain names produced by the SFC module and other enriching details are then passed to an alert module which then uses this information to present and prioritize DGA alerts enriched with both textual and temporal information to the user, allowing the user to better focus his attention on those alerts with: obvious textual similarities within the series of domain names that have been assessed to exhibit DGA behaviour, higher coherence scores as assessed by the AE-C module, periodicity as assessed by our FSA module, and possible resolutions to possible C2 servers as assessed by the FSR module.

The present invention will now be described in detail with reference to several embodiments thereof as illustrated in the accompanying drawings. In the following description, numerous specific features are set forth in order to provide a thorough understanding of the embodiments of the present invention. It will be apparent, however, to one skilled in the art, that embodiments may be realised without some or all of the specific features. Such embodiments should also fall within the scope of the current invention. Further, certain process steps and/or structures in the following may not have been described in detail and the reader will be referred to a corresponding citation so as to not obscure the present invention unnecessarily.

Further, one skilled in the art will recognize that many functional units in this description have been labelled as modules throughout the specification. The person skilled in the art will also recognize that a module may be implemented as circuits, logic chips or any sort of discrete component, and multiple modules may be combined into a single module or divided into sub-modules as required without departing from the invention. Still further, one skilled in the art will also recognize that a module may be implemented in software which may then be executed by a variety of processors. In embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

FIG. 1 illustrates a system for detecting series of DNS records that exhibit Domain Generation Algorithm (DGA) behaviours in accordance with embodiments of the invention. As illustrated, system 100 comprises deep learning classifier (DL-C) module 110, series filter-classifier (SFC) module 115, autoencoder-classifier (AE-C) module 120, frequency spectrum analyser (FSA) module 125, finding successful resolutions (FSR) module 119, alert module 130 and optionally, smoothing filter and Discrete Fourier Transform (DFT) module 117.

In operation, a stream of DNS records 105 is collected over a time period of interest and provided to deep learning classifier module 110. This time period may comprise any number of days, weeks or months and is left as a design choice to one skilled in the art. Subsequently, this time period of interest shall be referred to as the time period of correlation since we are essentially trying to find correlations within this time period to determine alerts that should be accorded higher confidence. In embodiments of the invention, this time period may comprise one month or 30 days.

The deep learning classifier module (DL-C) 110 then analyses each of the domain names contained within DNS records 105 to determine whether the domain name is a DGA or not and to determine DGA characteristics exhibited by the domain name. In other words, module 110 will identify DNS records having domain names that are probably associated with DGA, and for these identified possible DGA domain names, quantify how similar they are to each of the known DGA families. For example, if there are 87 known DGA families, each domain name that has been deemed by the DL-C module to be a possible DGA domain name will have an associated 87 dimensional vector with each element of the vector indicating percentage similarity between the domain name and the particular family. DNS records that have been deemed by the DL-C module to not be DGA are then removed from the DNS records by module 110. The detailed workings of deep learning classifier module 110 which is pre-trained (and optionally may be updated as its training dataset is updated) is described in greater detail in the later sections with reference to FIG. 3. The remaining DNS records are then provided to the SFC module 115.

At module 115, remaining DNS records are grouped based on source Internet Protocols (IPs), destination IPs, and time period of analysis, e.g. days, and this time period is arbitrarily chosen so that the time series characteristics can be determined over a fixed time period. In our embodiment, we used 1 day as the time period of analysis. Note that this time period of analysis differs from the time period of correlation. In particular, features will be extracted from this time period of analysis to determine if they correlate over the time period of correlation. Thus, the time period of analysis is a subset of the time period of correlation. By the end of this process, the various DNS records that have been deemed to possess DGA characteristics would have been grouped according to source-destination IP pair and time period of analysis. This ultimately gives us a series of possible DGA DNS records for each associated source-destination IP pair and time period of analysis. This series of DNS records contains both domain name strings and their associated time stamps, allowing us to conduct both string based and temporal based analysis.

A filter is then applied to each series of potential DGA DNS records to filter away records containing domain names that were not flagged with an NXDOMAIN response code (rcode) by a DNS server (not shown). Module 115 then identifies the main type of DGA characteristics displayed by the various series of possible DGA domain names tagged with NXDOMAIN rcode. NXDOMAIN domain names and their associated DNS records that do not exhibit at least one of the main identified characteristics are then also removed from the respective series. By the end of this module, each series of domain names would also have been tagged to one of the known families of DGA. Additionally, it should be noted that each remaining item in each series would also display similar characteristics as each other as determined by module 110, since the output of module 110 was used to identify the main DGA characteristics of each series. In other words, only possible DGA domain names that exhibit at least one of the top few occurring DGA characteristics will be selected to remain in each series and each of the series is then labelled based on the top occurring DGA characteristic associated with the cluster.

In an exemplary embodiment of the invention, the series filter-classifier may be configured to execute the following methodology:
1. The top-k known DGA characteristics that were exhibited by each domain name from each series as determined by the deep learning classifier module 110 are initially selected. For example, if a particular series comprises $N_{total}$ DNS records, and correspondingly, $N_{total}$ domain name strings, a $N_{total} \times k$ matrix of known DGA classes will be selected.
2. DNS records that are not tagged as NXDOMAIN will then be filtered away resulting in $N_{NXDOMAIN} \times k$ matrix of DGA classes.

3. The mode, M, of the $N_{NXDOMAIN} \times k$ matrix is then used to label the series as DGA M.
4. We can then find the top-c most frequently occurring characteristics in the $N_{NXDOMAIN} \times k$ matrix, $m_1$, $m_2$, ..., $m_C$
5. All the domains that do not have at least one of $m_1$, $m_2$, ... $m_C$ in their top-k classes are then filtered away.

By the end of this process, each series of DNS records would be labelled with its corresponding label, M, which has been deemed by deep learning classifier module 110 to be the dominant characteristic displayed by each series of DNS records. Also, each series of DNS records now only contains NXDOMAIN DNS records that exhibit at least one of the top-c characteristics of the series as one of their top-k characteristics. In embodiments of the invention, the value of k may be arbitrarily set to 5 (and is typically based on the performance of the DL-C module in trying to achieve an arbitrary classification accuracy), c may be arbitrarily set to 1 and must be less than or equal to k.

Each series is then sorted based on their associated timestamps and the timestamps in each series are then normalized over the time period of analysis. In embodiments of the invention, the sorting of each series based on their associate timestamps and the normalization of the timestamps may take place before the series filter-classifier is applied to each of the series. In embodiments of the invention, this sorting is done within the series to ensure that the records are sorted by chronological order. This is done by making use of the timestamp properties, which is one of the fields of a typical DNS record structure.

Thus, multiple series of DNS records would be generated and the records within each series of DNS records would be sorted by chronological order within the time period of analysis (e.g. 1 day) and would have been classified by the deep learning classifier module 110 to exhibit the top-c most frequently occurring DGA characteristics in each series as one of their top-k characteristics.

In summary, up to this point, each series of DNS records would have a label M and every element of the series comprises a NXDOMAIN type DNS record. The time stamps associated with each DNS record in each series is then used to map out a time series of occurrences, i.e. a plot of number of DGA occurrences against time. To do this, the relative times are first computed (i.e. the time difference between each record in the series and the first record in the series—normalization of the timestamps). The relative times are then binned into a predetermined time interval (i.e. the time interval bins are referred to as the sampling period) whereby in an exemplary embodiment of the invention, the sampling period may be set as 1 minute (i.e. 60 seconds).

Figure 4:
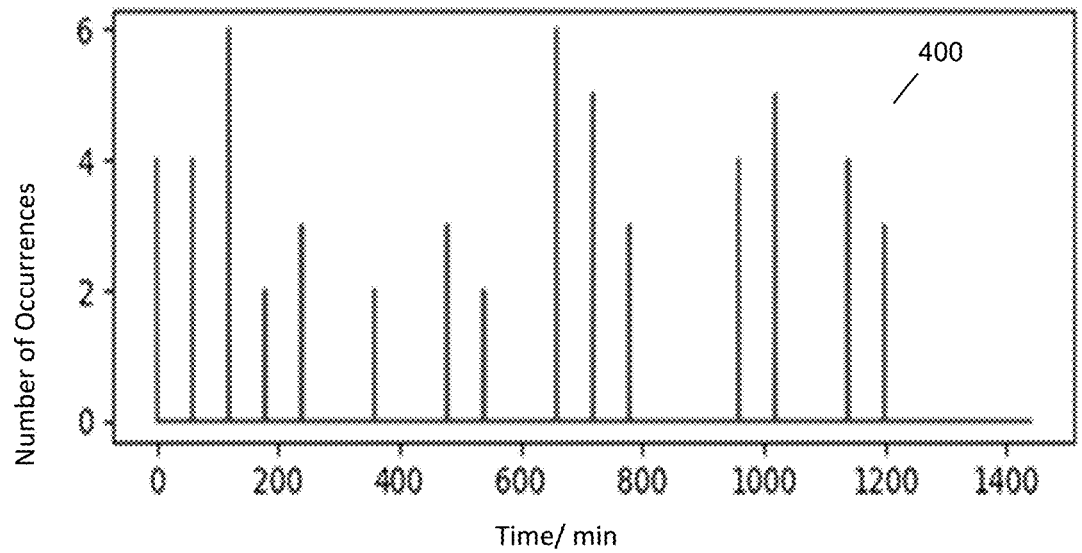
FIG. 4 illustrating a plot showing the time series of number of possible DGA occurrences, that have been deemed to exhibit similar string characteristics, against time as extracted from a series of possible DGAs, output by the series filter-classifier module (SFC), in accordance with embodiments of the invention.

Plot 400 as illustrated in FIG. 4 shows the number of possible DGA occurrences plotted against a 1 day time period of analysis, whereby in this plot, the x-axis was set to be 1440 minutes, which is equivalent to a time period of 1 day. For each minute (in terms of relative time), the number of records that occurred in that minute, relative to the first record is consolidated (i.e. binned), counted and plotted.

The final step of module 115 is to then make use of typical peak detection and clustering algorithms to compute the number of DGA bursts that occur throughout the period of analysis. We define DGA bursts as groups of DGA occurrences that can be chained to one another with an interval of at most $t_C$ minutes apart between each element of the chain. This means that there must be no DGA occurrences for at least $t_C$ minutes before the next DGA occurrence for us to declare 2 bursts (i.e. any DGA occurrences that happen within the $t_C$ minutes would be chained together with other elements of the first burst). In some embodiments, $t_C$ can be arbitrarily set to 5 minutes. In our embodiment, this additional information was used to further drop series that exhibit only a single burst throughout the period of analysis. In embodiments of the invention, Constant False Alarm Rate (CFAR) algorithm and Hierarchical Clustering were used to determine the number of DGA bursts that occurred throughout the period of analysis. As the use of CFAR and hierarchical clustering is widely used and documented in synthetic aperture radar applications, it will not be described in greater detail for brevity.

These time series are then provided to the autoencoder-classifier (AE-C) module 120 whereby the various time series of DGA occurrences and the labels M associated with each series of possible DGA DNS records are used to train this module. The detailed workings of AE-C module 120 is described in greater detail in the later sections with reference to FIG. 5. Once module 120 has been trained using these series, the trained autoencoder-classifier module 120 is then subsequently applied to each of these series to generate a coherence score. The aim of module 120 is to determine the ease of learning the time domain (or in some embodiments the frequency domain) characteristics associated with each labelled series and correspondingly, whether there is coherency among the various series that have been given the same label by module 115. A higher coherence score indicates that the particular series has a more coherent set of time/frequency domain characteristics as compared to other series of the same label. This indicates that similar time series structures are observed with other series of the same label, increasing the suspiciousness of the particular series.

Next, the various series of possible DGA DNS records and their associated time series of occurrences as obtained from the output of module 115 together with their associated coherence scores as generated by AE-C module 120 are then provided to the Frequency Spectrum Analysis (FSA) module 125. FSA module 125 aims to determine whether there are any strong temporal periodic behaviours displayed by the timestamps associated with the series of possible DGA DNA records (i.e. the time series of occurrences of the various DGA DNS records in each series). FSA module 125 applies a smoothing filter followed by a Discrete Fourier Transformation (DFT) to the time series of DGA occurrences to convert it from the time domain to the frequency domain. In embodiments of the invention, the smoothing filter may comprise, but is not limited to, a Hanning Filter, a Blackman filter or any other similar type of smoothing filter to prevent a brick wall effect when the contents are converted from the time domain to the frequency domain.

Figure 6:
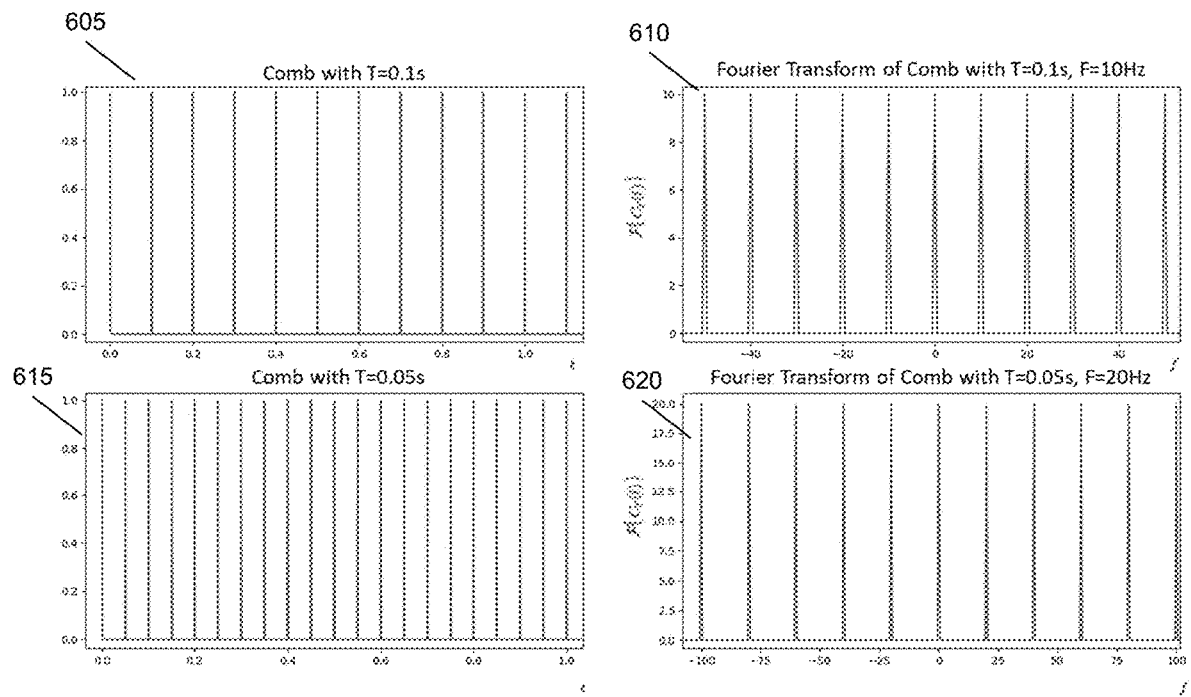
FIG. 6 illustrating plots of signals that exhibit Dirac comb-like properties in time domain and its corresponding frequency domain when the period, T is 0.1 and 0.05 seconds in accordance with embodiments of the invention.

FSA module 125 then identifies peaks in the frequency spectrum (i.e. DGA frequency domain peaks), indicating possible periodic and correspondingly possible automated malware behaviour. For each of these DGA frequency domain peaks in the frequency spectrum, FSA module 125 will first assess whether it should declare the presence of a periodic signal. If so, it will also assess the possible number of phase shifted signals present at each frequency so that the user has an estimate of the number of infected computers even when just looking at post Network Address Translation (NAT) traffic data (i.e. NATed traffic data). The detailed workings of FSA module 125 is described in greater detail in a later section with reference to FIGS. 6 and 7.

In parallel, the finding successful resolutions (FSR) module 119 takes the possible DGA NOERROR DNS records that were dropped by module 115 to find possible DGA domains that resolved to possible C2 servers. In particular, for each series of possible DGA NOERROR DNS records associated with each series of possible DGA NXDOMAIN DNS records, module 119 determines the top-k characteristics exhibited by the domain name associated with each record. If at least one of characteristics $m_1, m_2, \ldots m_C$ exists as one of the top-k characteristic of the possible DGA NOERROR DNS records, that record is kept so that its associated domain name and DNS record can be presented to users of the system subsequently.

In an exemplary embodiment of the invention, for each series of DNS records associated to a particular source IP, destination IP and period of analysis, FSR module 119 is configured to obtain the $N_{total} \times k$ matrix of classes from deep learning classifier module 110 and keep those DNS records that have a response code of NOERROR (i.e. DNS records with a successful resolution) to produce a $N_{NOERROR} \times k$ matrix. As described previously, for each series of DNS records associated to a particular source IP, destination IP and period of analysis, SFC module 115 is also configured to obtain a $N_{total} \times k$ matrix of classes. DNS records that did not have a response code of NXDOMAIN are then filtered away by module 115 for all its subsequent analysis. Each series was then tagged with label M, the top occurring DGA characteristic of each series of possible DGA NXDOMAIN DNS record). In addition, the top-c most frequently occurring characteristics of each series of possible DGA NXDOMAIN DNS records, $m_1, m_2, \ldots m_C$ was also determined. Using the output from module 115, FSR module 119 then identifies those records having (1) the NOERROR response code and (2) at least one of characteristics $m_1, m_2, \ldots m_C$ as one of the top-k characteristics. In other words, FSR module 119 only identifies rows of $N_{NOERROR} \times k$ matrix, which have one of characteristics $m_1, m_2, \ldots m_C$ present in their k columns. The idea behind this module is that: given that each series of NXDOMAIN DNS records has already been determined to exhibit certain characteristics, this module will then identify those NOERROR records which also have similar characteristics. This additional information is extremely useful for threat analysts as the discovery of such resolved DGA domains indicate that the attacker infrastructure has already been setup. Thus, these DGA domains are of particular interest and priority for threat analysts to follow up on.

Alert module 130 then receives the various series of possible DGA DNS records, each enriched with the following information: (1) Label M, which describes the most common DGA characteristic present in each series of possible DGA DNS records, (2) The number of DGA bursts throughout the period of analysis, (3) The coherence score as computed by the AE-C module, (4) The possible frequencies and the number of associated signals per frequency that are present within each time series of possible DGA occurrences associated with each series of possible DGA NXDOMAIN DNS records and, (5) Possible NOERROR DGA domain names that were resolved by the DNS server, indicating possible C2 domains. By setting thresholds on each of these additional enriching data fields, DGA alerts can be prioritized and presented to users of the system so that alerts of higher confidence can be acted upon quickly In embodiments of the invention, outputs from alert module 130 may comprise lists or series of NXDOMAIN domain names that have been classified to display at least one of characteristics $m_1, m_2, \ldots m_C$ (whereby $m_i$ is a label associated with known DGA families) as one of their top-k characteristics, the number of DGA bursts that occurred within the time period of analysis, coherence scores indicating the presence of unique, learnable characteristics that may be associated with the labels tagged to each series of DNS records by SFC module 115, a list of frequencies and number of signals per frequency computed based on the time series of DGA occurrences whereby the presence of such frequencies indicate the presence of a software automating the DGA bursts and thus may be used to indicate the increased probability that malware is present, and finally an associated series of resolved NOERROR DGA domain names indicating possible DGA domain names that resolved to possible C2 servers.

In another embodiment of the invention, a smoothing filter and Discrete Fourier Transform (DFT) module 117 may be configured to convert the time series of possible NXDOMAIN DGA occurrences, associated with each series of possible NXDOMAIN DGA DNS records output by module 115, from the time domain to the frequency domain (i.e. frequency spectrums). Autoencoder-classifier module 120, will then make use of the frequency spectrums to compute the coherence scores in place of the time series of possible DGA occurrences.

Figure 2:
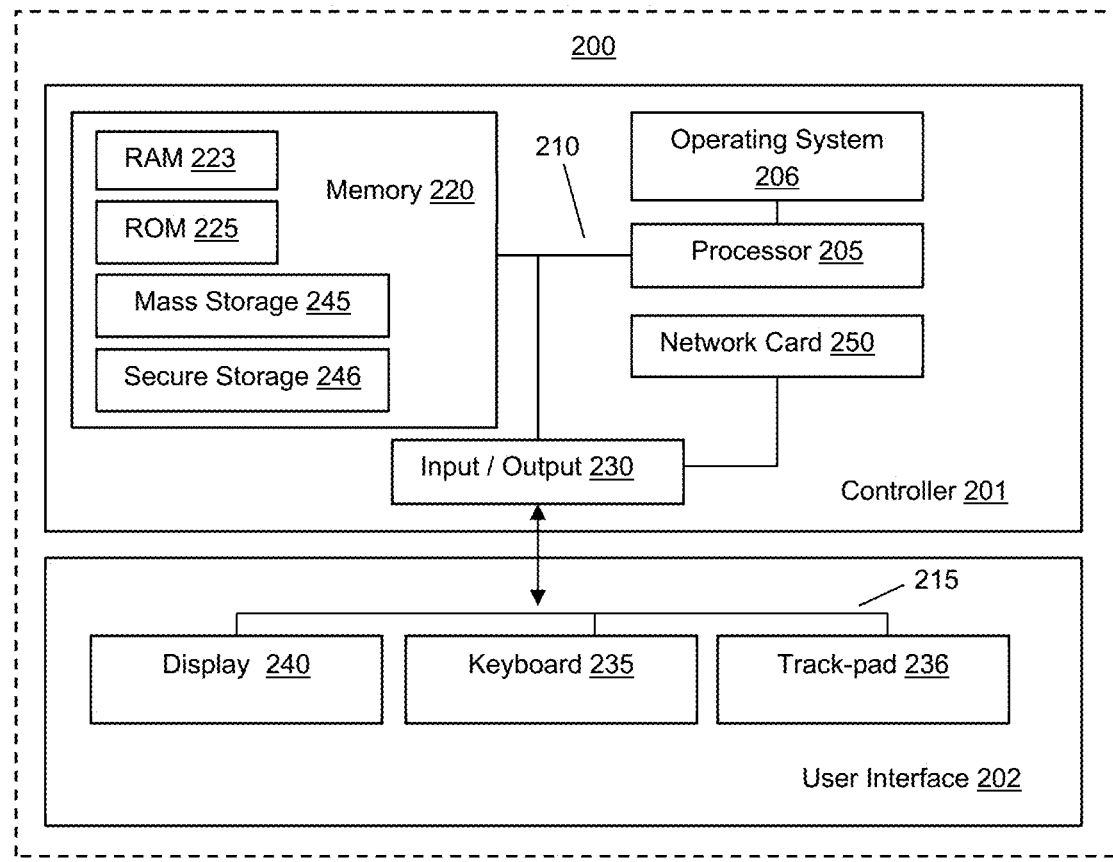
FIG. 2 illustrating a block diagram representative of processing systems providing embodiments in accordance with embodiments of the invention.

In accordance with embodiments of the invention, a block diagram representative of components of processing system 200 that may be provided within modules 110, 115, 120, 125, 130, 117, 119 and any other modules of the system for implementing embodiments in accordance with embodiments of the invention is illustrated in FIG. 2. One skilled in the art will recognize that the exact configuration of each processing system provided within these modules may be different and the exact configuration of processing system 200 may vary and FIG. 2 is provided by way of example only.

In embodiments of the invention, each of the modules in system 100 may comprise controller 201 and user interface 202. User interface 202 is arranged to enable manual interactions between a user and each of these modules as required and for this purpose includes the input/output components required for the user to enter instructions to provide updates to each of these modules. A person skilled in the art will recognize that components of user interface 202 may vary from embodiment to embodiment but will typically include one or more of display 240, keyboard 235 and track-pad 236.

Controller 201 is in data communication with user interface 202 via bus 215 and includes memory 220, processor 205 mounted on a circuit board that processes instructions and data for performing the method of this embodiment, an operating system 206, an input/output (I/O) interface 230 for communicating with user interface 202 and a communications interface, in this embodiment in the form of a network card 250. Network card 250 may, for example, be utilized to send data from these modules via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 220 and operating system 206 are in data communication with CPU 205 via bus 210. The memory components include both volatile and non-volatile memory and more than one of each type of memory, including Random Access Memory (RAM) 220, Read Only Memory (ROM) 225 and a mass storage device 245, the last comprising one or more solid-state drives (SSDs). Memory 220 also includes secure storage 246 for securely storing secret keys, or private keys. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 205 may be provided by any suitable logic circuitry for receiving inputs, processing them in accordance with instructions stored in memory and generating outputs (for example to the memory components or on display 240). In this embodiment, processor 205 may be a single core or multi-core processor with memory addressable space. In one example, processor 205 may be multi-core, comprising—for example—an 8 core CPU. In another example, it could be a cluster of CPU cores operating in parallel to accelerate computations.

Figure 3:
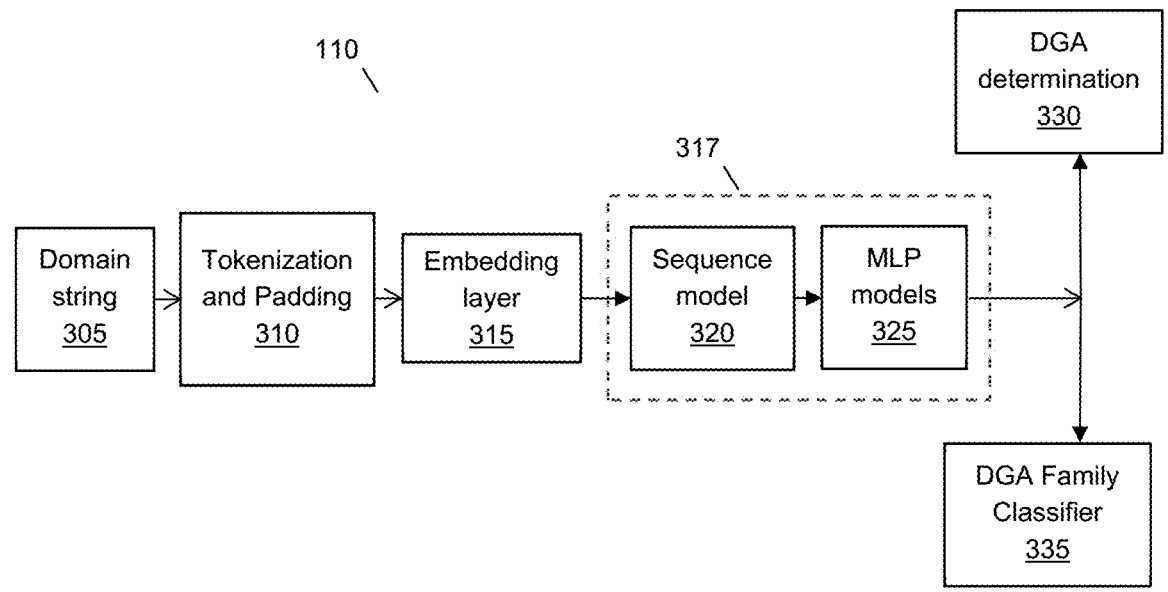
FIG. 3 illustrating a block diagram of modules that may be used to implement the deep learning classifier module in accordance with embodiments of the invention.

FIG. 3 illustrates modules that may be used to implement deep learning classifier module 110 in accordance with embodiments of the invention. In operation, module 110 is configured to receive a batch of domain name strings 305, and from this batch, identify which domain names comprise possible DGA domain names. For these identified possible DGA domain names, module 110 then determines characteristics among the known families of DGA that are exhibited by these domain names. In general, module 110 utilizes a modified You-Only-Look-Once (YOLO) architecture and a modified loss function to pre-train a deep learning model. This is done using data collected from labelled open-source datasets, internal databases and third party databases. These data comprising of the following: (1) the domain name string, (2) whether the domain name string is a DGA or not, and (3) the associated DGA family if the domain name string is a DGA can then be used to train the deep neural network via a composite loss function derived from the YOLO algorithm.

As illustrated in FIG. 3, domain name string 305 is first provided to tokenization and padding module 310. In accordance with embodiments of the invention, at module 310, the domain name string is tokenized at a character level, with each character being assigned an integer number. In this embodiment, the following characters may be tokenized:
   a. 26 lower case alphabets: 'a' to 'z'
   b. 10 numerals: '0' to '9'
   c. 1 subdomain separator: '.'
   d. 1 out-of-vocab token for anything else
   e. 1 for padding One skilled in the art will recognize that other types of characters may also be tokenized without departing from this invention. As a result of the above tokenisation methodology, up to a total of 38 tokens may be generated with each token corresponding to one of the characters above. An additional token is then added to the tokens to pad the tokens as required. Table 1 below illustrates an exemplary tokenization and padding process whereby mapping was done between the characters in the strings and their corresponding tokens:

TABLE 1

| Character | pad | 'a' | 'b' | ... | 'z' | '0' | '1' | '2' | ... | '.' | Anything else |
|---|---|---|---|---|---|---|---|---|---|---|---|
| Token | 0 | 1 | 2 | ... | 26 | 27 | 28 | 29 | ... | 37 | 38 |

As an illustration of the tokenization process, the string 'ab.ab' will be converted to a list of integers as follows, [1, 2, 37, 1, 2] based on the mapping in Table 1. After the tokenization process, each list of integers will be pre-padded or truncated to a length of 80 (arbitrarily chosen). This implies that lists of integers with less than 80 tokens, will have token(s) 0 added in front of the list until the total length is 80. For those lists that are more than 80 tokens long, only the last 80 tokens will be considered.

The various lists are then provided to embedding layer 315. Embedding layer 315 comprises a trainable layer and it is configured to assign a 32 dimensional vector to each of the 38 tokens. One skilled in the art will recognize that dimensional vectors of other sizes may be used without departing from the invention. As each list is passed through embedding layer 315, the list would be converted to a 32×80 matrix (row×column) whereby each of the 80 columns corresponds to a 32 dimensional vector, assigned by embedding layer 315 depending on the token found at the particular character position.

This 32×80 matrix is then provided to deep learning neural network 317, comprising sequence model 320, which may comprise, but is not limited to, Recurrent Neural Networks (RNNs), Convolutional Neural Networks (CNNs), Transformer Neural Networks (TNN) or a combination of the three. The output of sequence model 320 may then be flattened into a single vector which may then be passed to Multi-Layered Perceptron (MLP) layer models 325 to produce the following outputs:

1. A single neuron activated by the sigmoid function, which indicates whether the domain string is DGA or not (1 for DGA, 0 for non DGA), which is denoted by the symbol, B; or
2. A combination of 87 neurons, collectively activated by the softmax function, providing an indication of which characteristics, among the 87 known DGA classes, the domain string exhibits. This dimensional vector is denoted as, $\hat{C}$.

It is clear that with multiple outputs from MLP models 325, a composite loss function is required. In order to determine the composite loss function, the binary cross entropy loss and the categorical cross entropy loss is defined as follows:

$$\text{Binary Cross Entropy Loss} = -b\log(B) - (1-b)\log(1-B)$$

$$\text{Categorical Cross Entropy Loss} = -\sum_{i}^{n} t_i \log(C_i)$$

where b is defined as the label of whether a particular string is DGA, i.e. it would be 1 for a DGA string and 0 for a non-DGA string, B is defined as the sigmoid output of the neural network which indicates whether a particular string is DGA or not, $\hat{t}$ is defined as a one-hot vector, with a 1 corresponding to the labelled DGA class, and $t_i$ represents a particular dimension of the one-hot vector.

In an embodiment of the invention, under the assumption that 87 classes/families of DGA are known, both the one-hot vector $\hat{t}$ and the dimensional vector $\hat{C}$ would comprise 87 dimensional vectors and n represents the total number of dimensions. As a result, the composite loss function may be defined as follows:

Composite Loss =
$$(-b\log(B) - (1-b)\log\log(1-B)) + \gamma b\left(-\sum_{i}^{n} t_i \log\log(C_i)\right)$$

where γ is a coefficient that can be tuned to weight the relative importance of the two loss functions. It is useful to note that b, which is the Boolean ground truth label as to whether a particular string is DGA or not, is also used as a coefficient in the second term. This formulation indicates that the categorical cross entropy loss is only optimized when the domain string is labelled as a DGA, else only the binary cross entropy loss is optimized. This is similar to the formulation of the YOLO algorithm. This approach is advantageous as it allows the neural network to simultaneously output (1) probability that a particular string is DGA and (2) the characteristics of known DGA displayed by the particular string if the particular string has been determined to be a DGA, via a single forward pass of the neural network.

Once the composite loss function is defined, optimization algorithms like ADAM, Stochastic Gradient Descent (SGD), etc. can be used to train the model. In an embodiment of the invention, Stochastic Weight Averaging (SWA) algorithm was used with a disjointed cyclical learning rate to train deep learning model 317 and embedding layer 315. A Transformer based architecture was also utilized with dropouts to reduce overfitting of the loss function.

Once model 317 and embedding layer 315 is trained, model 317's binary output, B, can be used by DGA determination module 330 to determine if the domain string is DGA or not and its output vector Ĉ may be used by DGA family classifier 335 to determine the DGA family to which the DGA probably belongs to. Additionally, as the output comprises a discrete probability distribution due to its softmax activation layer, the output may be interpreted as weighted characteristics, whereby the weightage is proportional to the DGA characteristics exhibited by the input domain string (in relation to the 87 known DGA classes). In short, at the end of deep learning classifier module 110, only DNS records with domain strings that are deemed to be DGA by module 110's DGA Determination module 330 will remain and the others will be dropped.

Figure 5:
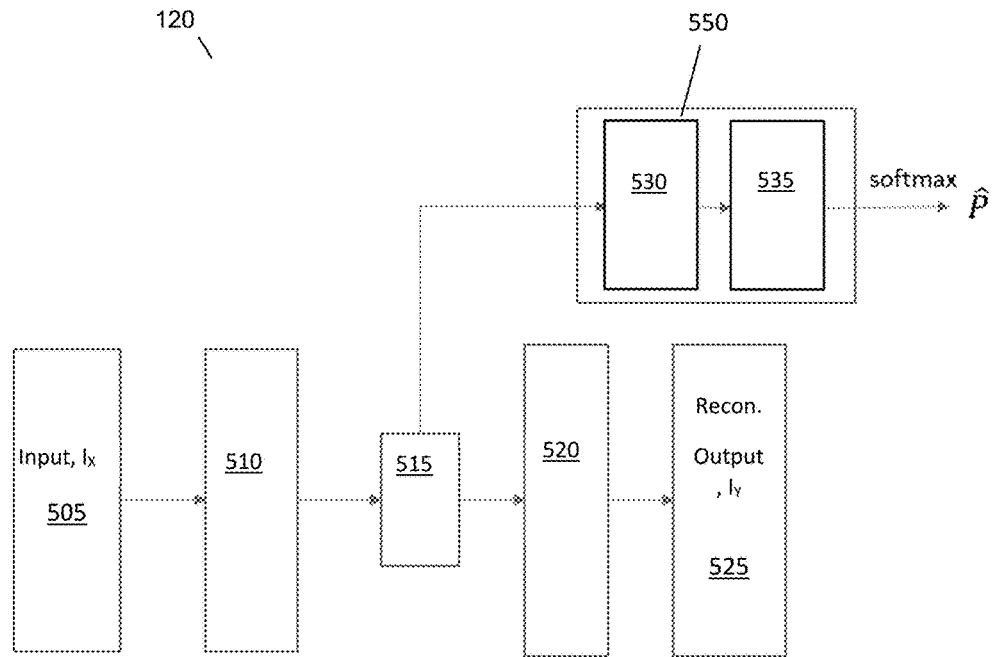
FIG. 5 illustrating a block diagram that may be used to implement the autoencoder-classifier (AE-C) module in accordance with embodiments of the invention.

FIG. 5 illustrates modules that may be used to implement the autoencoder-classifier (AE-C) module 120 in accordance with embodiments of the invention. In particular, AE-C module 120 is made up of a composite autoencoder which comprise sequence models in modules 510 and 520, and a classifier 550 comprising a combination of sequence models and multilayer perceptrons (MLP) in modules 530 and 535. Encoding 515 is simply a low dimensional representation of $I_X$ 505, output by encoder module 510. This low dimensional representation will be used by decoder module 520 to produce reconstructed output $I_Y$, which is ideally equivalent to $I_X$. In an embodiment of the invention, when the input, $I_X$ 505 comprises a time series as inputs (and output, $I_Y$, comprises a reconstructed time series), modules 510, 520, 530 and 535 may comprise memory-based modules, memoryless modules or a combination of memory-based/memoryless modules. In another embodiment of the invention, when the input $I_X$ 505 comprises a frequency spectrum, obtained via a Discrete Fourier Transform (DFT) of the time series of DGA occurrences, as input (and output, $I_Y$, comprises the reconstructed frequency spectrum), modules 510, 520, 530 and 535 may comprise multilayer perceptrons (MLPs).

To recap, outputs from the SFC module 115 are provided to AE-C module 120. These outputs comprise series containing DGA associated domain names that exhibit at least one of the top-c occurring DGA characteristics of the series as one of their top-k characteristics. Additionally, the DNS records in each of these series have been sorted based on their associated timestamps and normalized based on a first record of each series to produce an associated time series of number of DGA occurrences over the period of analysis (e.g. plot 400 as illustrated in FIG. 4). Each of these series were also determined to have more DGA bursts over the period of analysis than a pre-set threshold and have also been labelled based on the top occurring DGA characteristic associated with the series. Autoencoder-classifier 120 is then configured to use these series as a labelled dataset to train a deep learning model via conventional supervised learning techniques.

Autoencoder-classifier 120 aims to determine whether there is a learnable structure in the received dataset of series, particularly, the time series of DGA occurrences associated with each series of DNS records or its corresponding frequency spectrum if module 117 is used. In other words, given the various series and their associated labels, autoencoder-classifier 120 will make a determination whether it would be possible for a mathematical model to learn and distinguish the patterns among the various labels and if so, to what extent. The idea behind this is to determine whether a unique discernible structure to the data exists for each label. If there isn't, the confidence of the mathematical model would be low as it would essentially be training on noise-like inputs.

As illustrated in FIG. 5, low dimensional encodings 515 are provided to classifier 550. Classifier 550 will then determine whether the input to module 120 has a structure and if it determines that a structure exists, classifier 550 will proceed to learn a definition of each class of the input.

In embodiments of the invention, the loss function, L, to train autoencoder-classifier 120 may be defined as follows:

$$L_{recon} = \|I_Y - I_X\|^2 \quad L_{class} = -\sum_{i}^{n} p_i \log\log(P_i) \quad L = L_{class} + \alpha L_{recon}$$

where $p_i$ is the $i^{th}$ component of a one-hot vector $\hat{p}$ which is derived from the label M that is associated with each input $I_X$, $I_Y$ is the output of decoder module 520 which is ideally a reconstruction of the input $I_X$, $P_i$ is the $i^{th}$ dimension of the softmax output, $\hat{P}$, of classifier 550, and α is the coefficient for the reconstruction loss.

In an exemplary embodiment of the invention, it is assumed that there exists 87 known DGA classes. As such, both $\hat{p}$ and $\hat{P}$ would comprise 87 dimensional vectors. In some embodiments of the invention, only classifier 550 and encoder 510 may be used without the need for the decoder 520. This essentially turns it into a simple classification problem. However, in most embodiments of the invention, the autoencoder loss, which necessitates the inclusion of decoder 520, was utilized as a form of regularization to ensure the neural network bases its classification on a smaller dimensional embedding 515, from which $I_X$ can be reconstructed, instead of simply memorizing input 505.

Once the autoencoder-classifier 120 is trained using the loss function, L, for a specific number of epochs (1000 epochs in the case of our embodiment), the trained autoencoder-classifier 120 may then be applied to the same data that was used to train it. Autoencoder-classifier 120 then produces as its output coherence scores for each series of possible DGAs produced by module 115. The coherence scores represent confidence scores accorded by autoencoder-classifier 120 whereby the higher the confidence score, the more attention that should be paid to that particular series of DNS records as this means that its temporal/frequency characteristics analysed over the time period of analysis (1 day in the case of our embodiment) has been deemed to be observed multiple times over the time period of correlation (1 month in the case of our embodiment).

It is important to note that the purpose of the model trained in autoencoder-classifier 120 is to assess whether there are any temporal characteristics (and correspondingly, frequency spectrum characteristics) that can be associated to each DGA label that was tagged to each series of possible DGA DNS records over just the period of correlation. As such, the model used in autoencoder-classifier 120 is not meant to generalize to other periods of correlations (in our embodiment, other months of data). Thus, it is discarded once it outputs its confidence and classification for each series in the current period of correlation.

In accordance with embodiments of the invention, series output by SFC module 115 and subsequently enriched with coherence scores via autoencoder-classifier 120 are then provided to FSA module 125. As mentioned earlier, FSA module 125 aims to determine whether there are any strong temporal periodic behaviours displayed by the timestamps associated with the series of possible DGA DNA records. FSA module 125 applies a smoothing filter followed by a Discrete Fourier Transformation (DFT) to the time series of DGA occurrences to convert it from the time domain to the frequency domain before conducting in depth frequency analysis to enumerate both the possible frequencies within the signal and the number of phase shifted signals at each frequency.

It is useful to note that the method described here is not limited to just analysing periodicity in the series of DGA timestamps, but may also be used to detect other threats that display similar traits such as beaconing, which is defined as the periodic communication (i.e. heartbeat) between source destination IP pairs.

In accordance with an embodiment of the invention, FSA module 125 works as follows:
1. The inputs to this module comprise a time series of occurrences. A filtered time series of occurrences may then be obtained by applying a windowing function/smoothing filter (in our embodiment, the Hanning filter) to the time series of occurrences.
2. When the time series of occurrences is used, a periodic signal would exhibit itself in the time domain as illustrated in plots 605 and 615 of FIG. 6. As can be seen, plots 605 and 615 depict signals that repeat every 0.1 and 0.05 seconds respectively, with 1 occurrence each time.
3. The above signals are in fact similar to the Dirac comb (also known as the Dirac train). The Dirac comb has a very useful property which states that the magnitude of the Fourier transform of the Dirac comb, repeating at a frequency of $f_1$ Hz (i.e. repeating every $1/f_1$ s), is also a Dirac comb, with the Dirac function repeating every $f_1$ Hz in the frequency domain. Plot 610 which is a Fourier transform of plot 605 and plot 620 which is a Fourier transform of plot 615 illustrates this concept.
4. Mathematically, it can be described as follows:

$$F\left(\sum_{n=-\infty}^{\infty} \delta(t - nT_1)\right) = \frac{1}{T_1} \sum_{n=-\infty}^{\infty} \delta\left(f - \frac{n}{T_1}\right),$$

where F( ) represents the Fourier Transform, $\delta$ is the Dirac function and $T_1$ is the periodicity of the Dirac train.
5. There are two major things to note in the above equations:
   a. First, the frequency of the Dirac comb in the time domain can be determined by observing when the Dirac function repeats itself in the frequency domain.
   b. Second, the magnitude of the Dirac comb in the frequency domain is $1/T_1$, which is in fact the frequency of the Dirac function in the time domain.
6. Using the above two derivations, it is clear that for a single signal at a single frequency, the signal frequency can be determined by identifying the location at which the Dirac function repeats itself in the frequency domain and also ensuring that the magnitude of the signal at $f_1$ (in the frequency domain) is $1/T_1 = f_r$.
7. Next, it should be noted that:
   a. Fourier transformation is additive. Thus, multiple signals in the time domain (i.e. additive summation of multiple signals in the time domain) would simply be a summation in the frequency domain.
   b. Finally, it should be noted:

$$F(x(t-t_0)) = e^{-j2\pi f t_0} F(x(t))$$

The above equation states that if a signal is time shifted in the time domain, it will manifest itself as a phase shifted version in the frequency domain. Thus, if two signals exist at the same frequency, $f_1$ but at different phases, the magnitude of frequency domain magnitude would not be $2f_1$, but rather $|f_1 + e^{-j2\pi f t_0} f_1|$.

An exemplary pseudocode for FSA module 125 is set out below.
1. Input:
   $x_t$: Hanning filtered time series of occurrences
2. Compute $x_f = F(x_t)$
3. Conduct CFAR and hierarchical clustering on $x_f$ to determine the location of the peaks. Let $P_f = \{p_0, p_1, p_2, \ldots\}$ be the set of frequencies (sorted in ascending order) that are output by the CFAR and hierarchical clustering process. Let $M_f = \{m_0, m_1, m_2, \ldots\}$ be the set of corresponding frequency spectrum magnitudes for each of the frequencies in the set $P_f$
4. If $p_0 \neq 0$ Hz break out of the algorithm and end here
5. If $p_0 = 0$ Hz:
   zero_freq_mag=$m_0$
   Drop $p_0$ and $m_0$ from the set of $P_f$ and $M_f$ respectively
6. Initialize objects to store final output:
   possible_freqs=[ ]
   possible_freq_amplitude=[ ]
   possible_signal_count=[ ]
   Let min_num_sig be the threshold minimum number of signals
7. For each $p_n$ in $P_f$:
   Compute the number of signals, $N_{s,tent}$ at frequency $p_n$ by using $N_{s,tent} = m_n/p_n$
   If $N_{s,tent} >$ min_num_sig:
     If possible_freqs==[ ]:
       Append $p_n$ to possible_freqs
       Append $m_n$ to possible_freq_amplitude Append $N_{s,tent}$ to possible_signal_count
Else:
If $p_n$ is not divisible by any item in possible_freqs:
Append $p_n$ to possible_freqs
Append $m_n$ to possible_freq_amplitude
Append $N_{s,tent}$ to possible_signal_count
Else:
Let div_freq be the frequency that $p_n$ is divisible by and $N_{s,tent,div}$ be the number of signals estimated to exist at div_freq.
If $m_n > div_{freq} \times N_{s,tent,div}$:
Append $p_n$ to possible_freqs
Append $m_n - (div_{freq} \times N_{s,tent,div})$ to possible_freq_amplitude Append $\dfrac{m_n - (div_{freq} \times N_{s,tent,div})}{p_n}$ to possible_signal_count 8. possible_signal_count_rounded=⌈possible_signal_count⌉, where ⌈ ⌉ indicates the element wise ceiling function.
9. unaccounted_magnitude=zero_freq_mag−sum(possible_signal_count_rounded×possible_freqs)
10. Make use of unaccounted_magnitude to iteratively determine the best combination of $p_n$'s in possible_freqs that sum to unaccounted_magnitude, and add the additional signals to the corresponding indices of possible_signal_count_rounded. This step can be solved via the well-known knapsack problem algorithm, which will not be described here for brevity.
11. At the end of the algorithm,
  a. possible_freqs is an array of possible frequencies
  b. possible_signal_count_rounded is an array that contains the number of signals at each corresponding frequency in possible_freqs One skilled in the art will recognize that other forms of pseudocode may be used to carry out the function of FSA module 125 without departing from the invention. Making use of the above algorithm and pseudo code, the FSA module will be able to determine what periodic signals exists and the number of signals at each frequency.

Figure 7:
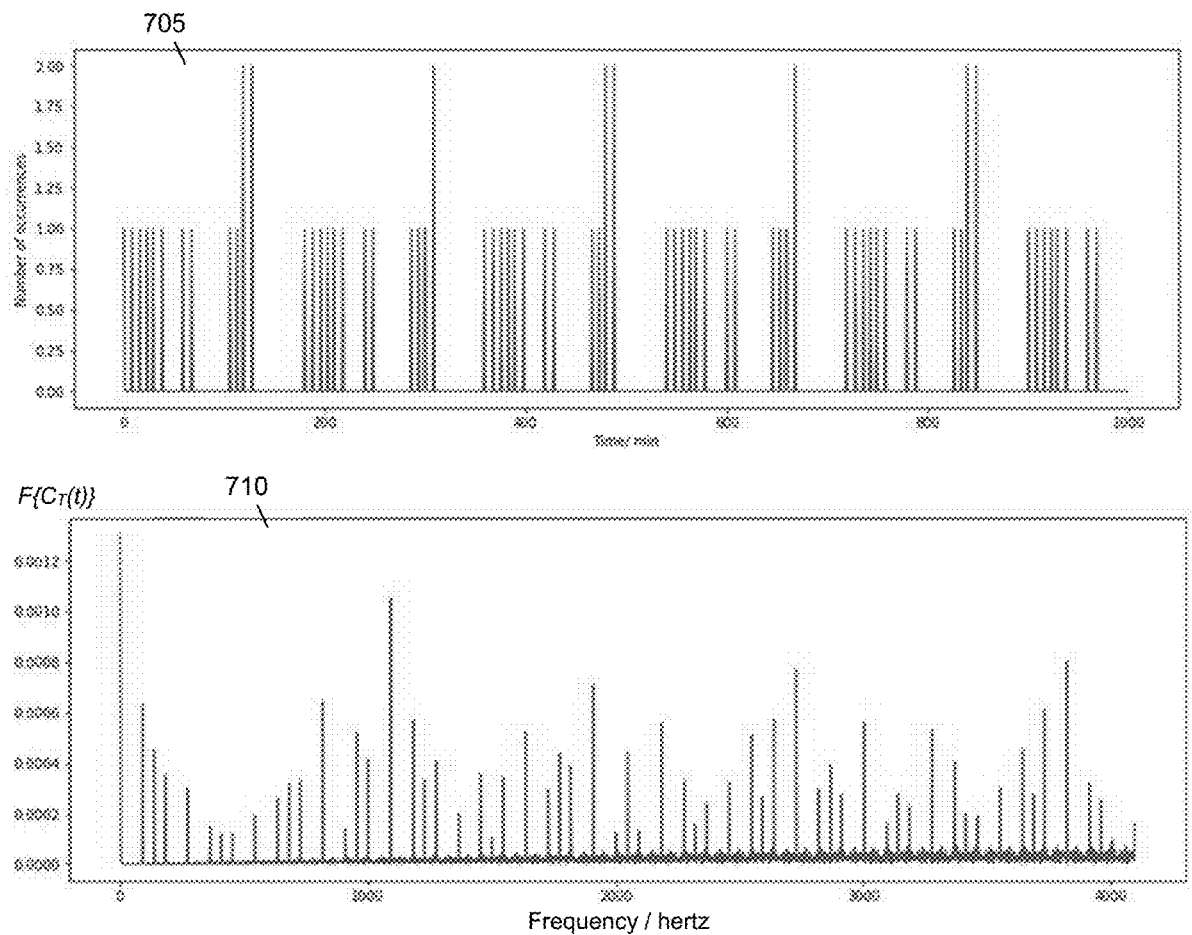
FIG. 7 illustrating a plot of multiple phase shifted signals in time domain and its corresponding frequency domain plot in accordance with embodiments of the invention.

It should be emphasised that the above method is also able to enumerate the periodic signals that are present even when there are multiple frequencies present in the Dirac comb, and multiple phase shifted signals at each frequency. Plots 705 of FIG. 7 illustrate such a case where there are 3 frequencies present, with multiple signals at 1 of the frequencies. Although the Fourier Transform plot as shown in Plot 710 of FIG. 7 is no longer as uniform as those of plots 610 and 620 of FIG. 6, the above described method is able to correctly enumerate and identify all the signals.

Figure 8:
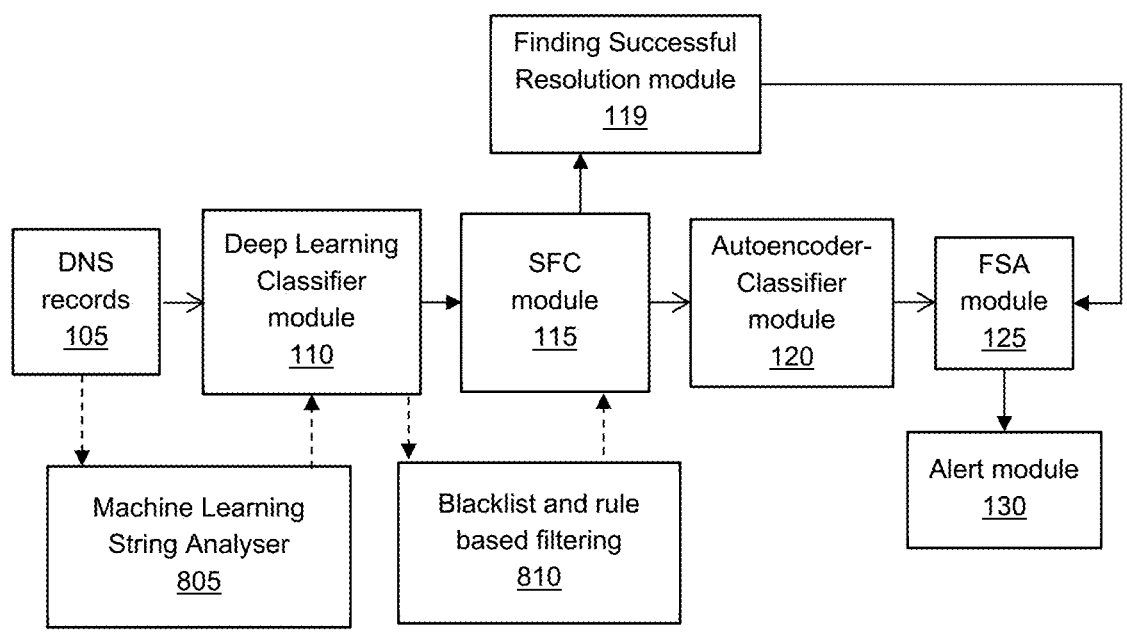
FIG. 8 illustrating multiple embodiments of the system for detecting DGA behaviours in accordance with embodiments of the invention.

FIG. 8 illustrates multiple other embodiments of the invention whereby system 100 may include, but is not limited to, various combinations of additional modules such as machine learning string analyser 805 and blacklist and rule based filtering module 810.

In embodiments of the invention, machine learning string analyser (ML-SA) 805 may be configured to process DNS records 105 before the processed DNS records are provided to deep learning classifier module 110. The main aim of analyser 805 is to initially filter the voluminous amounts of Telco-level DNS records with the objective of removing domain names that are clearly not DGA. In order to carry out this filtering step, any basic machine learning model known in the art, such as the Random Forest algorithm may be pre-trained and applied on the textual features of the DNS records to output a binary decision as to whether the string is a possible DGA or not. The textual features used to train the model in the ML-SA module may comprise, but are not limited to:
I. Length
II. Entropy
III. Character N-Grams (3,4,5)
IV. Distinct Character Count
V. Webgram similarity Score: Similarity of a domain to a legitimate web domain
VI. Wordgram similarity score: Similarity of a domain to a dictionary word It should be noted that the main aim of this model is to reduce the downstream computational load on the system. Thus, a low threshold was set so that the probability of True Positives being filtered out is low. As more DGA families become known, the model may be retrained and updated as required.

In other embodiments of the invention, before the series filter-classifier module 115, a blacklist and rule based filtering module 810 is configured to remove, using a blacklist, legitimate domains associated with DGA-like algorithms and domain names having invalid Top-Level Domain (TLD) features. In addition to the blacklist, module 810 will also remove records based on the following rules:
1. The domain name string query associated with each DNS record must be a valid domain name. For example, there must be at least one '.' in the domain name string query.
2. The domain name string must contain a valid TLD.
3. There must be valid characters in the domain name string.
4. There must be valid number of characters in the domain name string.

The blacklist utilized by module 810 may be updated over time based on the additional findings obtained as the algorithm runs over extended periods of time. Additionally, the rules, being extremely simple in nature, may also be altered according to how the user see fits.

An exemplary system or method for detecting Domain Generation Algorithm (DGA) behaviours in DNS records in accordance with embodiments of the invention is set out in the steps below. The steps of the method as implemented by the system illustrated in FIG. 1 are as follows:

Step 1: receiving, using a deep learning classifier module, a stream of Domain Name System (DNS) records; and identifying DNS records having DGA associated domain names and the DGA characteristics associated with each of the DGA associated domain names;

Step 2: grouping, using a series filter-classifier (SFC) module, identified possible DGA DNS records from the deep learning classifier module into series based on the source IPs, destination IPs and time period of analysis associated with each identified possible DGA DNS record; applying a series filter-classifier to each series to select NOERROR DGA associated domain names that exhibit at least one of the top-c occurring DGA characteristics of the series as one of their individual top-k characteristics and labelling the series based on the top occurring DGA characteristic; sorting each series based on their associated timestamps and normalize the timestamps in each series based on a first record of the series to obtain a time series of DGA occurrences over a time period of analysis; and applying peak detection methods together with hierarchical clustering on the time series of DGA occurrences to determine the number of DGA bursts within the time period of analysis and filtering away the corresponding series with less DGA bursts than a particular pre-set amount.

Step 3: for each series obtained from the SFC module, use an autoencoder-classifier module comprising an autoencoder and a classifier merged in a single network to generate a coherence score for each series tagged by the SFC module with label M, wherein autoencoder-classifier module was trained using the series and labels obtained from the SFC module, and a loss function based on components of a one-hot vector $\hat{p}$ that was derived from the labels of the series, dimensions of a softmax output $\hat{P}$ of the classifier and a reconstruction loss weighted by coefficient $\alpha$;

Step 4: identifying, using a frequency spectrum analyzer (FSA) module, periodic dirac comb signals that exist within the time series of DGA occurrences, their associated frequencies and the number of phase shifted signals at each frequency.

Step 5: identifying, using the FSR module, possible DGA domain names that resolved to possible C2 servers.

Step 6: producing and prioritizing, using an alert module, enriched DGA alerts with data fields comprising the series of NXDOMAIN DGA DNS records and its associated number of bursts obtained from the SFC module, coherence score obtained from the AE-C module, possible periodic signals obtained from the FSA module and possible DGA domains that resolved to possible C2 servers obtained from the FSR module.

Figure 9:
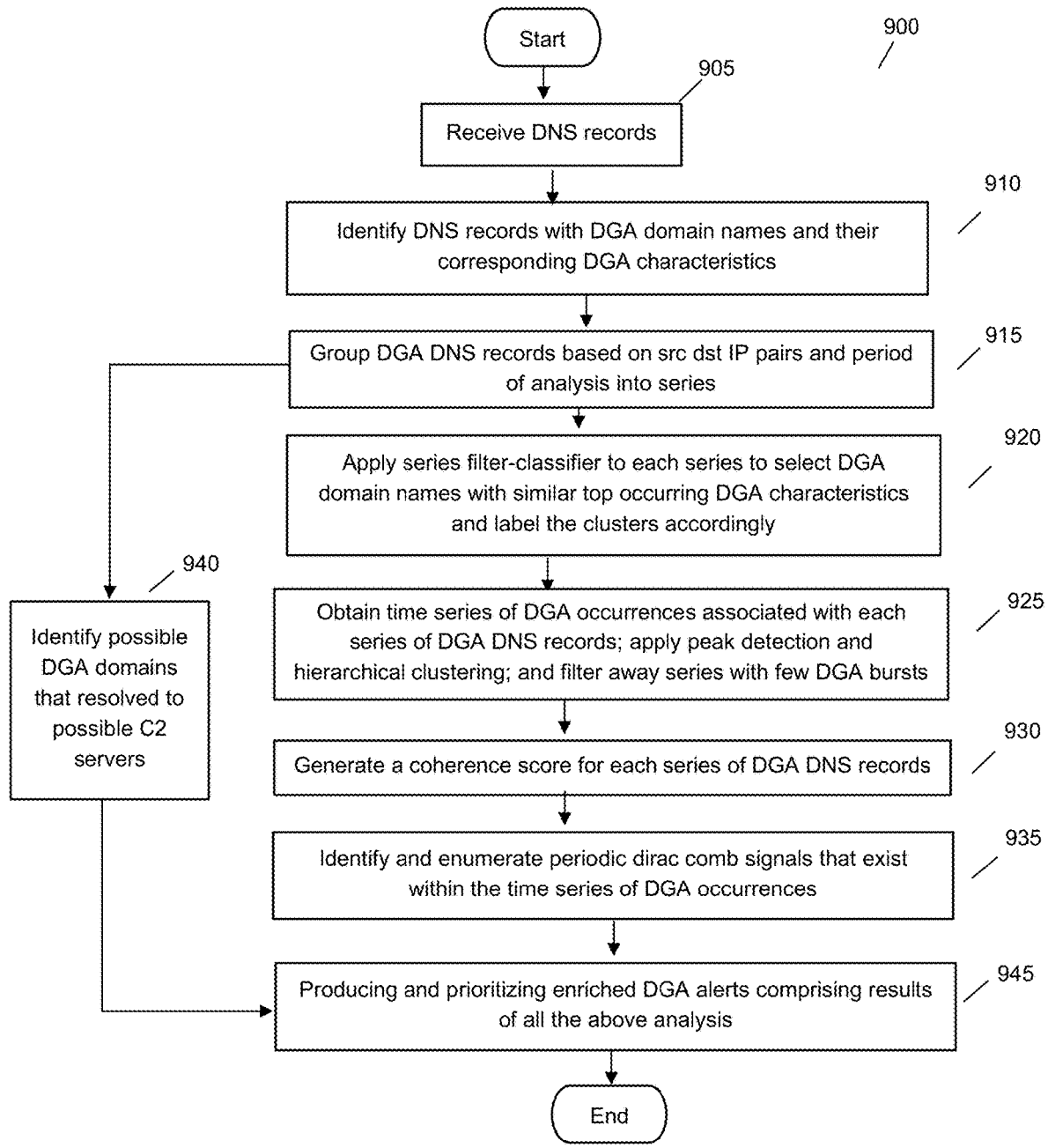
FIG. 9 illustrating an exemplary process for detecting DGA behaviours using a deep learning classifier module, a series filter-classifier module, an autoencoder-classifier module, a frequency spectrum analyser module, a finding successful resolutions module and an alert module, in accordance with an embodiment of the invention.

A process for detecting DGA behaviours in DNS records in accordance with embodiments of the invention is illustrated in FIG. 9. Process 900 begins at step 905 whereby a deep learning classifier module is configured to receive a stream of DNS records. DNS records having DGA associated domain names and DGA characteristics associated with each of the DGA associated domain names are then identified at step 910. Process 900 then uses a SFC module to group identified DNS records into series, based on time period of analysis, source Internet Protocols (IPs) and destination IPs associated with each identified DGA DNS record. This takes place at step 915.

At step 920, process 900 then makes use of SFC module to go through each series and select DGA associated domain names that exhibit at least one of the top-c occurring DGA characteristics of the series as one of their top-k characteristics; and label the series based on the top occurring DGA characteristic. This takes place at step 920.

Process 900 then again makes use of the SFC module to sort each series based on their associated timestamps; and normalize the timestamps in each series based on the first record of the cluster to obtain a time series of number of DGA occurrences over the time period of analysis; and determine the number of DGA bursts for each time series of DGA occurrences via typical peak detection and hierarchical clustering algorithms; and filter away those series with DGA bursts less than a pre-set amount are dropped. This takes place at step 925.

Process 900 then uses an autoencoder-classifier module comprising an autoencoder and a classifier within a single neural network, to generate a coherence score for each series. This takes place at step 930.

At step 935, process 900 then identifies, using the FSA module, possible Dirac comb signals that exist within the time series of DGA occurrences and enumerates them in terms of determining their frequency and the number of signals at each frequency. It does this by first applying an appropriate windowing function to the time series of occurrences followed by converting it to the frequency domain for in depth frequency spectrum analysis.

At step 940, using the FSR module, process 900 makes use of the top-c characteristics of the series, identified by the SFC module, to find DGA NOERROR DNS records that also exhibit at least one of these characteristics as one of their top-k characteristics, and declare them as DGA domains that resolved to C2 servers.

Process 900 then proceeds to step 945 whereby it uses an alert module, to produce and prioritize DGA alerts with enriching data fields, comprising results of all the above analysis, based on user defined thresholds for each associated enriching data field. Process 900 then ends.

Experimental Results

Figure 10:
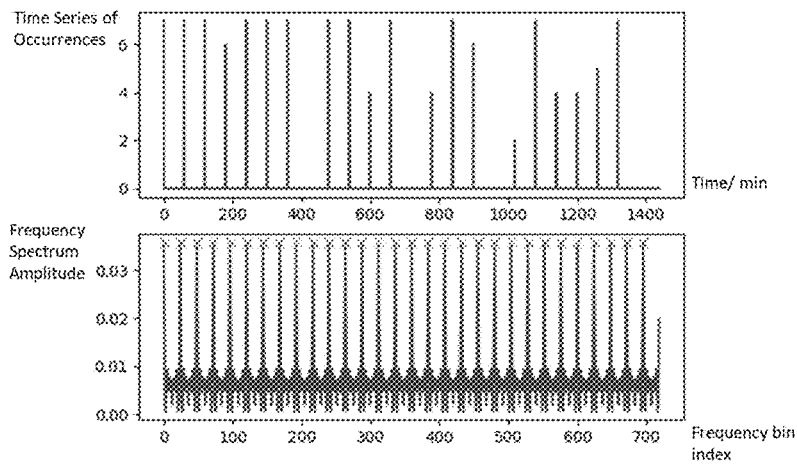
FIG. 10 illustrating the importance of temporal analysis in providing higher confidence to real life DGA alerts.

From experiments carried out using system 100, as illustrated in FIG. 1, on a few months of telco level traffic data, it was found that system 100 had the ability to identify similar DGA records and group these DGA records together thereby significantly reducing the work of threat analysts. For most algorithms in the literature, a DNS record is simply classified whether it is DGA or not. Doing so would result in a huge number of DGA alerts. Unlike solutions proposed by those skilled in the art, system 100 was able to reduce the total number of alerts within a month of telco data, from 9 million to 227 and each of the 227 alerts were found to contain a series of domains that were deemed to have similar strings and suspicious temporal characteristics. Of the 227 alerts, threat analysts were able to confirm that 85 of these alerts were true positives at first glance. The rest were subsequently found to be DGA-like but non-malicious in nature as some legitimate programs also employed DGA for specific purposes. These can be used to subsequently update our internal database and blacklist. Additionally, system 100 was found to be able to detect DGA strings that have different top level domains without any rules being hard-coded. Furthermore, system 100 was able to detect multiple DGA series that exhibit temporal behaviour as shown in FIG. 10. Clearly, there is a strong periodic signal, as seen by the extremely regular pattern in the frequency domain, indicating highly probable malware behaviour. This highlights the importance of the time series analysis for DGA detection and its ability to provide significantly higher confidence alerts to the user of the system.

Figure 11:
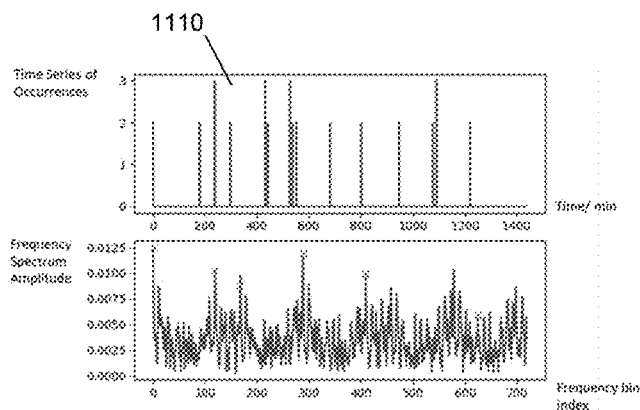
FIG. 11 illustrating new threats that this invention can detect despite the lack of rules and hand engineered features

During our analysis, we also picked up some series as shown in plot 1105 of FIG. 11. At first sight, it seems like the invention may have picked up a false positive as the domains do not look similar. There are also a lot of repeated domains. However, after looking at the periodicity analysis, as shown in plot 1110 of FIG. 11, we also find some strong periodic signals, this time with multiple frequencies. After conducting further in-depth analysis, our threat analysts note that every single one of the domains in the list is flagged up as a malicious domain by an independent threat intelligence source. This exemplifies this invention's ability to pick up new threats despite not being explicitly designed to do so. We opine that this stems from the minimal use of rules and hand engineering of features, resulting in an algorithm that can generalize better in large scale deployment on telco level traffic data.

As such, it was found that the invention was able to detect DGAs from a stream of telco-level DNS records in an efficient and effective manner, using temporal features that no other system, to the best of our knowledge, has thus far exploited at this scale. Numerous other changes, substitutions, variations and modifications may be ascertained by one skilled in the art and it is intended that the present invention encompass all such changes, substitutions, variations and modifications as falling within the scope of the appended claims.

We also showcase our FSA module's ability to detect and pick up periodic signals generated via both code simulation (periodic signals generated via code) and platform simulation (periodic signals consisting of actual generated network traffic transmitted among computers connected in a network for real life simulation purposes). Table 2 below shows our results. As can be seen, out of the 42 actual signals, the FSA module was able to detect 37 of the signals accurately (88.1% accuracy). In fact, of the 12 test cases, we were able to obtain all the frequencies present for all except 1 of the case; we only missed the 90 minute period signal in case 10. This is equivalent to a 92% accuracy. Counting the number of signals at each frequency is a more challenging task due to the phase shift in the frequency domain complicating calculations. Nevertheless, out of all the 23 correctly detected frequencies, we were able to obtain the correct number of signals for 18 of them. This is a 78% accuracy. This module would be extremely useful for other cyber applications, especially beaconing.

TABLE 2

| Experiment | Actual Signals | Discovered Signals | Type |
|---|---|---|---|
| 1 | 1 × 60 s | 1 × 60 s | Simulated on Platform |
| 2 | 1 × 60 s | 1 × 60 s | Simulated in code |
| 3 | 1 × 60 s | 1 × 60 s | Simulated in code |
| 4 | 3 × 60 min | 2 × 60 min | Simulated on Platform |
| 5 | 3 × 60 min | 3 × 60 min | Simulated in code |
| 6 | 3 × 60 min | 3 × 60 min | Simulated in code |
| 7 | 2 × 90 min, 4 × 60 min | 2 × 90 min, 1 × 60 min | Simulated on Platform |
| 8 | 2 × 90 min, 4 × 60 min | 2 × 90 min, 4 × 60 min | Simulated in code |
| 9 | 2 × 90 min, 4 × 60 min | 2 × 90 min, 4 × 60 min | Simulated in code |
| 10 | 1 × 90 min, 1 × 80 min, 1 × 70 min, 1 × 60 min | 1 × 80 min, 1 × 70 min, 1 × 60 min | Simulated on Platform |
| 11 | 1 × 90 min, 1 × 80 min, 1 × 70 min, 1 × 60 min | 1 × 90 min, 1 × 80 min, 2 × 70 min, 2 × 60 min | Simulated in code |
| 12 | 1 × 90 min, 1 × 80 min, 1 × 70 min, 1 × 60 min | 1 × 90 min, 1 × 80 min, 2 × 7 0min, 1 × 60 min | Simulated in code |

The invention claimed is:

1. A system for detecting Domain Generation Algorithm (DGA) behaviours comprising:
  a memory storing instructions: and
  a processor, coupled to the memory and configured to process the stored instructions to implement:
    a deep learning classifier (DL-C) module configured to:
      receive a stream of Domain Name System (DNS) records; and
      identify DNS records having DGA associated domain names and DGA characteristics associated with each of the DGA associated domain names,
    a series filter-classifier (SFC) module configured to:
      group identified DNS records from the DL-C module into series based on source IP, destination IP and time period of analysis associated with each identified DNS record having a DGA associated domain name;
      for each series, identify and select NXDOMAIN DGA associated domain names that exhibit at least one of a top-c occurring DGA characteristic of the series as one of its top-k characteristics, and labelling the series based on a top occurring DGA characteristic;
      sort each series based on their associated timestamps and normalize the timestamps in each series based on a first record of the series to obtain a time series of DGA occurrences over the time period of analysis; and
      provide NOERROR DNS records un-associated with identified NXDOMAIN DGA DNS records to a finding successful resolutions (FSR) module, the FSR module being configured to identify DGA domains associated with command and control servers from the received DNS records;
    an autoencoder-classifier (AE-C) module comprising an autoencoder and a classifier merged into a single neural network with the AE-C module being configured to:
      for each time series of DGA occurrences obtained from the SFC module, generate a coherence score for each labelled series; and
      remove series having coherence scores below a predefined threshold;
      wherein the AE-C module was trained using the labelled time series of occurrences obtained from the SFC module, and a loss function based on components of a one-hot vector $\hat{p}$ that was derived from labels of the series, dimensions of a softmax output $\hat{P}$ of the classifier and a reconstruction loss weighted by coefficient $\alpha$;
    a frequency spectrum analyser (FSA) module configured to:
      identify DGA frequency domain peaks associated with each of the time series of DGA occurrences for the purpose of determining periodic signals within each of the time series of DGA occurrences;
      determine a frequency and a corresponding period for each of the periodic signals within each of the time series of DGA occurrences; and
      identify a number of phase-shifted signals present for each of the determined frequencies; and
    an alert module configured to prioritize DGA alerts based on the time series of DGA occurrences produced by the SFC module, the time series produced by the AE-C module, the identified number of phase shifted signals determined by the FSA module, and the identified DGA domains as determined by the FSR module.

2. The system according to claim 1, further comprising:
  a smoothing filter and Discrete Fourier Transform module being configured to:
    apply a smoothing filter to the time series of DGA occurrences output by the SFC module; and
    convert, using a Discrete Fourier Transform algorithm, the filtered time series of DGA occurrences from the time domain to a frequency domain so that inputs to a neural network of the AE-C module comprise a frequency spectrum.

3. The system according to claim 1, further comprising:
  a machine learning string analyser (ML-SA) module, wherein before the DL-C module identifies the DNS records having DGAs and their associated characteristics, the ML-SA module is configured to:

filter, using a machine learning algorithm, the DNS records to remove domain names that are not associated with known DGAs from the DNS records, whereby the machine learning algorithm was trained using at least one of the following labelled features: length of a domain name, entropy of the domain name, character n-gram of the domain name, distinct character count of the domain name, webgram or wordgram similarity scores, and whereby the machine learning algorithm is trained using a labelled open-source dataset, internal databases and third party databases.

4. The system according to claim 1, wherein the DL-C module comprises:

a You-Only-Look-Once (YOLO) architecture configured to:

train itself based on character level tokenisation to produce a set of embeddings that is passed through a neural network to produce a binary decision to determine if a domain name string comprises a DGA and if it is determined that the domain name string comprises the DGA, to generate a probability distribution indicating which family of known DGAs the domain name string belongs to.

5. The system according to claim 4, wherein the YOLO architecture comprises an embedding layer communicatively connected to a deep neural network, whereby the embedding layer is configured to convert a list of character tokens to a matrix, and wherein the deep neural network is configured to use a composite loss function based on a binary cross entropy loss and a categorical cross entropy loss, where the composite loss function is defined as:

$$\text{Composite Loss} = (-b\log(B) - (1-b)\log\log(1-B)) + \gamma b\left(-\sum_{i}^{n} t_i \log\log(C_i)\right)$$

where b is defined as a label that indicates whether a particular string comprises the DGA, B is defined as a sigmoid output of the neural network which indicates whether a particular string is DGA, $t_i$ is defined as a particular dimension of a one-hot vector, which is activated only at a location corresponding to a family label of a particular DGA string, $\ddot{C}$ is defined as a softmax activated vector output by the neural network, n is defined as a total number of dimensions of $\hat{C}$, which corresponds to a total number of known DGA families used to train the DL-C module, and γ is defined as a tunable coefficient which is used to weight a relative importance between the binary cross entropy loss and a softmax cross entropy loss.

6. The system according to claim 1, wherein before the SFC module is applied to the DNS records that have been associated with DGA domain strings by the DL-C module, a blacklist and rule based filtering module is configured to:

remove, using a blacklist, legitimate domains associated with a DGA-like algorithm; and remove domain names having invalid Domain and Top-Level Domain (TLD) features.

7. The system according to claim 1, wherein the loss function used to train the AE-C module is defined as:

$$\text{Loss} = -\sum_{i}^{n} p_i \log\log(P_i) + \alpha\|I_y - I_x\|^2$$

where $I_X$ is defined as an input signal related to the time series of the DGA occurrences output by the SFC module, which is fed as input to the autoencoder, $I_Y$ is an output signal of the autoencoder, $p_i$ is an $i^{th}$ dimension of the one-hot vector $\hat{p}$, which is derived from a label tagged to the series by the SFC module, $P_i$ is an $i^{th}$ dimension of the softmax output, $\hat{P}$, of the classifier, and a is a reconstruction loss coefficient that is used to weight a relative importance of a classification loss versus a reconstruction loss.

8. The system according to claim 1, whereby a peak detection and hierarchical clustering algorithm used in the SFC module, to count a number of DGA bursts, and the FSA module, to detect peaks in a frequency spectrum, comprises a constant false alarm rate (CFAR) detection algorithm for peak detection and agglomerative clustering for hierarchical clustering.

9. The system according to claim 1, wherein the FSR module is further configured to:

obtain, from the DL-C module, DNS records having DGA associated domain names but tagged with NOERROR return code by a DNS server;

obtain, from the SFC module, the at least one top-c occurring DGA characteristic of each of the series output by the SFC module;

identify, from the NOERROR DNS records with DGA associated domain names, DNS records that correspond to each series, in terms of source IP, destination IP and time period of analysis, that exhibit the at least one top-c occurring DGA characteristic of the corresponding series as one of their top-k DGA characteristics, as determined by the SFC module; and provide the identified domain names corresponding to each series to the alert module.

10. A method for detecting Domain Generation Algorithm (DGA) behaviours using a system comprising a deep learning classifier (DL-C) module; a series filter-classifier (SFC) module; a finding successful resolutions (FSR) module; an autoencoder-classifier (AE-C) module comprising an autoencoder and a classifier merged into a single neural network; a frequency spectrum analyser (FSA) module and an alert module, the method comprising:

receiving, using the DL-C module, a stream of Domain Name System (DNS) records;

identifying, using the DL-C module, DNS records having DGA associated domain names and DGA characteristics associated with each of the DGA associated domain names, grouping, using the SFC module, identified DNS records from the DL-C module into series based on source IP, destination IP and time period of analysis associated with each identified DNS record having a DGA associated domain name whereby for each series, identifying and selecting NXDOMAIN DGA associated domain names that exhibit at least one of a top-c occurring DGA characteristics of the series as one of its top-k characteristics, and labelling the series based on a top occurring DGA characteristic;

sorting, using the SFC module, each series based on their associated timestamps and normalizing the timestamps in each series based on a first record of the series to obtain a time series of DGA occurrences over the time period of analysis;

providing, using the SFC module, NOERROR DNS records un-associated with identified NXDOMAIN DGA DNS records to the FSR module, the FSR module being configured to identify DGA domains associated with command and control servers from the received DNS;

generating, using the AE-C module, for each time series of DGA occurrences obtained from the SFC module, a coherence score for each labelled series, and removing series having coherence scores below a predefined threshold, wherein the AE-C module was trained using the labelled time series of occurrences obtained from the SFC module, and a loss function based on components of a one-hot vector $\hat{p}$ that was derived from labels of the series, dimensions of a softmax output $\hat{P}$ of the classifier and a reconstruction loss weighted by coefficient $\alpha$;

identifying, using the FSA module, DGA frequency domain peaks associated with each of the time series of DGA occurrences for the purpose of determining periodic signals within each of the time series of DGA occurrences;

determining, using the FSA module, a frequency and a corresponding period for each of the periodic signals within each of the time series of DGA occurrences;

identifying, using the FSA module, a number of phase-shifted signals present for each of the determined frequencies; and prioritizing, using the alert module, DGA alerts based on the time series of DGA occurrences produced by the SFC module, the time series produced by the AE-C module, the identified number of phase shifted signals determined by the FSA module, and the identified DGA domains as determined by the FSR module.

11. The method according to claim 10, further comprising:

applying, using a smoothing filter and Discrete Fourier Transform module, a smoothing filter to the time series of DGA occurrences output by the SFC module; and converting, using a Discrete Fourier Transform algorithm, the filtered time series of DGA occurrences from the time domain to a frequency domain so that inputs to a neural network of the AE-C module comprises a frequency spectrum.

12. The method according to claim 10, wherein before the DLC module identifying the DNS records having DGAs and their associated characteristics, the method further comprises:

filtering, using a machine learning string analyser (ML-SA) module, based on a machine learning algorithm, the DNS records to remove domain names that are not associated with known DGAs from the DNS records, whereby the machine learning algorithm was trained using at least one of the following labelled features: length of a domain name, entropy of the domain name, character n-gram of the domain name, distinct character count of the domain name, webgram or wordgram similarity scores, and whereby the machine learning algorithm is trained using a labelled open-source dataset, internal databases and third party databases.

13. The method according to claim 10, wherein the DL-C module comprises:

a You-Only-Look-Once (YOLO) architecture configured to:

train itself based on character level tokenisation to produce a set of embeddings that is passed through a neural network to produce a binary decision to determine if a domain name string comprises a DGA and if it is determined that the domain name string comprises the DGA, to generate a probability distribution indicating which family of known DGAs the domain name string belongs to.

14. The method according to claim 13, wherein the YOLO architecture comprises an embedding layer communicatively connected to a deep neural network, whereby the embedding layer is configured to convert a list of character tokens to a matrix, and wherein the deep neural network is configured to use a composite loss function based on a binary cross entropy loss and a categorical cross entropy loss, where the composite loss function is defined as:

$$\text{Composite Loss} = (-b\log(B) - (1-b)\log\log(1-B)) + \gamma b\left(-\sum_{i}^{n} t_i \log\log(C_i)\right)$$

where b is defined as a label that indicates whether a particular string comprises the DGA, B is defined as a sigmoid output of the neural network which indicates whether a particular string is the DGA, $t_i$ is defined as a particular dimension of a one-hot vector, which is activated only at a location corresponding to a family label of a particular DGA string, $\hat{C}$ is defined as a softmax activated vector output by the neural network, n is defined as a total number of dimensions of $\hat{C}$, which corresponds to a total number of known DGA families used to train the DL-C module, and $\gamma$ is defined as a tunable coefficient which is used to weight a relative importance between the binary cross entropy loss and a softmax cross entropy loss.

15. The method according to claim 10, wherein before the applying the SFC module to the DNS records that have been associated with DGA domain strings by the DL-C module, the method comprises:

removing, using a blacklist and rule based filtering module, legitimate domains associated with a DGA-like algorithm; and removing domain names having invalid Domain and Top-Level Domain (TLD) features.

16. The method according to claim 10, wherein the loss function used to train the AE-C module is defined as:

$$\text{Loss} = -\sum_{i}^{n} p_i \log\log(P_i) + \alpha \|I_y - I_x\|^2$$

where $I_X$ is defined as an input signal related to the time series of the DGA occurrences output by the SFC module, which is fed as input to the autoencoder, $I_Y$ is an output signal of the autoencoder, $p_i$ is an $i^{th}$ dimension of the one-hot vector $\hat{p}$, which is derived from a label tagged to the series by the SFC module, $P_i$ is an $i^{th}$ dimension of the softmax output, $\hat{P}$, of the classifier, and a is a reconstruction loss coefficient that is used to weight a relative importance of a classification loss versus a reconstruction loss.

17. The method according to claim 10, whereby a peak detection and hierarchical clustering algorithm used in the SFC module, to count a number of DGA bursts, and the FSA module, to detect peaks in a frequency spectrum, comprises a constant false alarm rate (CFAR) detection algorithm for peak detection and agglomerative clustering for hierarchical clustering.

18. The method according to claim 10, further comprising:
- obtaining, using the FSR module, from the DL-C module, DNS records having DGA associated domain names but tagged with NOERROR return code by a DNS server;
- obtaining, using the FSR module, from the SFC module, the at least one top-c occurring DGA characteristic of each of the series output by the SFC module;
- identifying, using the FSR module, from the NOERROR DNS records with DGA associated domain names, DNS records that correspond to each series, in terms of source IP, destination IP and time period of analysis, that exhibit the at least one top-c occurring DGA characteristic of the corresponding series as one of their top-k DGA characteristics, as determined by the SFC module; and
- providing, using the FSR module, the identified domain names corresponding to each series to the alert module.

* * * * *